(12) United States Patent
Gavino et al.

(10) Patent No.: US 10,867,164 B2
(45) Date of Patent: Dec. 15, 2020

(54) METHODS AND APPARATUS FOR REAL-TIME INTERACTIVE ANAMORPHOSIS PROJECTION VIA FACE DETECTION AND TRACKING

(71) Applicant: Intel Corporation, Santa Clara, CA (US)

(72) Inventors: Brandon Gavino, Beaverton, OR (US); Abhay Dharmadhikari, Portland, OR (US); Selvakumar Panneer, Portland, OR (US); Carl Marshall, Portland, OR (US); Vinay Nooji, Hillsboro, OR (US); Fan Chen, Portland, OR (US); Alexandra Warlen, San Francisco, CA (US)

(73) Assignee: Intel Corporation, Santa Clara, CA (US)

(*) Notice: Subject to any disclaimer, the term of this patent is extended or adjusted under 35 U.S.C. 154(b) by 112 days.

(21) Appl. No.: 16/023,967

(22) Filed: Jun. 29, 2018

(65) Prior Publication Data
US 2019/0042834 A1 Feb. 7, 2019

(51) Int. Cl.
*G06K 9/00* (2006.01)
*G06T 5/00* (2006.01)
(Continued)

(52) U.S. Cl.
CPC ....... *G06K 9/00288* (2013.01); *G06K 9/0061* (2013.01); *G06K 9/00228* (2013.01);
(Continued)

(58) Field of Classification Search
CPC ............. H01L 27/3251; H01L 27/3246; H01L 27/3253; H01L 27/3258; H01L 51/0024; H01L 51/524
See application file for complete search history.

(56) References Cited

U.S. PATENT DOCUMENTS

| 7,572,186 B2 * | 8/2009 | LeMay | ................... G07F 17/32 |
| | | | 273/138.1 |
| 8,964,052 B1 * | 2/2015 | Wooley | ................ H04N 5/2628 |
| | | | 348/211.99 |

(Continued)

OTHER PUBLICATIONS

Paul Bourke, "Calculating Stereo Pairs," [http://paulbourke.net/stereographics/stereorender/], retrieved on Apr. 23, 2019, 20 pages.

(Continued)

*Primary Examiner* — Md K Talukder
(74) *Attorney, Agent, or Firm* — Hanley, Flight & Zimmerman, LLC

(57) ABSTRACT

Methods, apparatus, systems, and articles of manufacture for real-time interactive anamorphosis projection via face detection and tracking are disclosed. An example system includes a sensor to capture an image of a face of a user. An augmented reality controller is to access the image from the sensor, determine a position of the face of the user relative to a display surface, and apply a perspective correction to an anamorphic camera representing a vantage point of the active user. A user application is to generate a scene based on the position of the anamorphic camera. A display is to present, at the display surface, the scene based on the vantage point of the active user.

20 Claims, 32 Drawing Sheets

(51) Int. Cl.
*G06T 7/70* (2017.01)
*G06T 3/60* (2006.01)
*G06T 3/00* (2006.01)
*G06K 9/46* (2006.01)
*G06K 9/62* (2006.01)
*G06T 19/00* (2011.01)
*G03B 37/06* (2006.01)
*G03B 21/14* (2006.01)

(52) U.S. Cl.
CPC ....... *G06K 9/00597* (2013.01); *G06K 9/4628* (2013.01); *G06K 9/627* (2013.01); *G06T 3/0006* (2013.01); *G06T 3/608* (2013.01); *G06T 5/002* (2013.01); *G06T 5/003* (2013.01); *G06T 7/70* (2017.01); *G06T 19/00* (2013.01); *G03B 21/147* (2013.01); *G03B 37/06* (2013.01)

(56) References Cited

U.S. PATENT DOCUMENTS

| | | | | |
|---|---|---|---|---|
| 9,123,171 | B1* | 9/2015 | Chavez | H04N 13/366 |
| 10,475,243 | B2* | 11/2019 | Marshall | G06T 19/006 |
| 2011/0142299 | A1* | 6/2011 | Akbarzadeh | G06K 9/00288 382/118 |
| 2013/0328762 | A1* | 12/2013 | McCulloch | G06F 3/017 345/156 |
| 2016/0014391 | A1* | 1/2016 | Hosenpud | H04N 13/366 348/46 |
| 2016/0328825 | A1* | 11/2016 | Yu | G06T 3/0093 |
| 2016/0337637 | A1* | 11/2016 | Hwang | G02F 1/133512 |
| 2018/0053056 | A1* | 2/2018 | Rabinovich | G06K 9/627 |
| 2018/0096503 | A1* | 4/2018 | Kaehler | G02B 27/0172 |
| 2018/0144556 | A1* | 5/2018 | Champion | G02B 27/017 |
| 2018/0300897 | A1* | 10/2018 | Woods | G06F 3/0484 |
| 2018/0350032 | A1* | 12/2018 | Bastani | G06T 15/20 |
| 2019/0042834 | A1* | 2/2019 | Gavino | G06T 5/002 |
| 2019/0221043 | A1* | 7/2019 | Kopper | G06F 3/014 |
| 2019/0342632 | A1* | 11/2019 | DeFaria | H04N 13/117 |
| 2019/0361526 | A1* | 11/2019 | Young | G06F 1/325 |
| 2019/0385342 | A1* | 12/2019 | Freeman | A61B 3/113 |
| 2019/0387168 | A1* | 12/2019 | Smith | G06F 3/0304 |

OTHER PUBLICATIONS

Wikipedia, "Cave Automatic Virtual Enviroment," [https://en.wikipedia.org/wiki/Cave_automatic_virtual_environment], retrieved on Apr. 23, 2019, 3 pages.
Hololamp, [http://hololamp.tech/], retrieved on Apr. 24, 2019, 4 pages.
Behind the Magic of Zspace, [https://zspace.com/technology/], retrieved on Apr. 24, 2019, 4 pages.
Cruz-Neira et al, "Surround-Screen Projection-Based Virtual Reality: The Design and Implementation of the Cave," [http://www8.cs.umu.se/kurser/TDBD13/VT00/extra/p135-cruz-neira.pdf], ACM SIGGRAPH. 27. 135-142., Aug. 1993, retrieved on Apr. 23, 2019, 8 pages.
Anxious // Bored, "The ParallaxView—Illusion of Depth by 3D Head Tracking on iPhone X," [http://www.anxious-bored.com/blog/2018/2/25/theparallaxview-illusion-of-depth-by-3d-head-tracking-on-iphone-x], Feb. 27, 2018, retrieved on Apr. 23, 2019, 16 pages.

* cited by examiner

METHODS AND APPARATUS FOR REAL-TIME INTERACTIVE ANAMORPHOSIS PROJECTION VIA FACE DETECTION AND TRACKING

FIELD OF THE DISCLOSURE

This disclosure relates generally to augmented reality, and, more particularly, to methods and apparatus for real-time interactive anamorphosis projection via face detection and tracking.

BACKGROUND

In recent years, virtual reality (VR) has become increasingly popular, especially in the entertainment industry. Virtual reality enables the depiction of a virtual environment that has interactive elements in the physical environment. Virtual reality implementations often use a combination of visual and tactile stimuli, implemented via devices such as headsets, controllers and various feedback devices. For a virtual reality device to depict an interactive virtual environment in a user's physical space, a virtual reality device is configured so a user's movement in the physical environment results in a corresponding movement in the virtual environment.

Existing solutions have relied on mobile devices using simultaneous location and mapping (SLAM), by using fiducial markers, or other methods of user-worn devices (head mounted displays (HMDs), infrared (IR)-emitting wearables and IR sensing cameras) to generate a user perspective rendering of 3D content. The compute capability, rendering quality, etc. of such systems are limited due to limited form factor design considerations (e.g., size constraints, weight constraints, battery constraints) of the device. Mobile-based augmented reality (AR) systems also restrict the user to view the augmentation of digital content in physical space by looking at a screen of the mobile device, rather than looking at the physical space. HMDs also pose limitations of a limited field of view for augmentation as well as being heavy and uncomfortable for everyday use.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Existing approaches for displaying 3D content involve having a user hold in their hand a screen to view the 3D content super-imposed on a synthetic world-image, mount on their head specialized hardware for viewing, or use specialized markers for tracking head movement/position to render the content on a separate display. Such solutions fail to integrate face tracking in a way that reliably and accurately allows for scene rendering controls that maintain correct user perspective. Calibration procedures for use with such existing systems typically require proper lighting, proper surface composition, and a homogenous surface area. Lastly, head-mounted displays (HMDs) and/or mobile devices suffer from the necessary balance of Size, Weight, And Power (SWAP) that dictate performance characteristics and scalability of content.

Example approaches disclosed herein utilize a glasses-free augmented reality system for real-time interactive anamorphosis projection to augment the physical space with a virtual image. That is, the user is not required to wear a head mounted device (HMD) or hold a device (e.g., a smartphone, a tablet, etc.). As used herein, interactive anamorphosis projection is a form of perspective projection distortion that allows a viewer to occupy a specific vantage point, and to reconstitute an otherwise distorted image. Thus, the augmented content is rendered based on user perspective, by tracking the user in real-time to bring the illusion that the digital content is real. Example approaches disclosed herein also eliminate per-user calibration procedures.

Using an imaging sensor and low latency, high accuracy, high frequency approaches for face detection, the example approaches disclosed herein are able to generate an accurate estimation of a user's perspective of 3D rendered content. Such an estimation enables efficient approaches for mapping a detected face to a virtual rendering camera, thereby integrating the virtual rendering camera (e.g., the user's vantage point) into a 3D content rendering system. Example approaches enable manipulation of the camera system to provide for scene transformations while maintaining correct user perspective via anamorphosis.

Example approaches disclosed herein enable presentation of 3D rendered content matched to a user's perspective without the need for user-mounted hardware and/or per-user calibration. Such approaches also allow for glass-free augmented reality experiences from the user's perspective, using any 2D display system (e.g., a liquid crystal display (LCD), a projection display, a television, etc.). Such approaches can be implemented as a standalone accessory form factor with supplemental hardware acceleration with high-speed low latency connections to an existing client system, or an all-in-one system mixing hardware accelerators and CPU/GPU accelerated processing.

Figure 1:
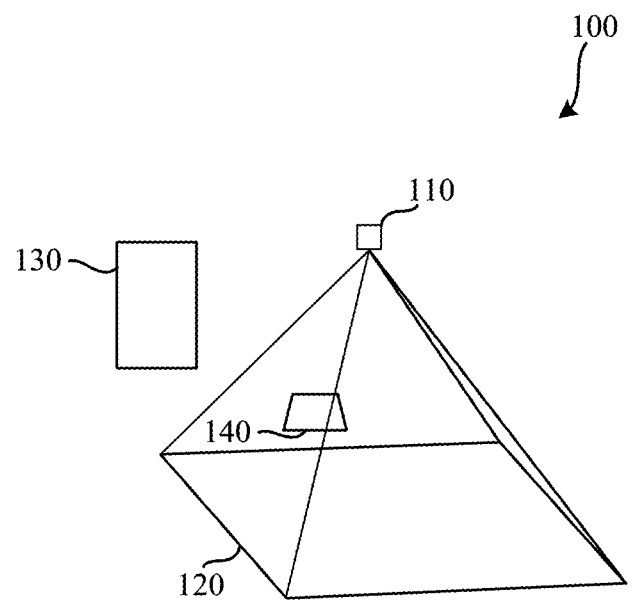
FIG. 1 is a diagram illustrating an example configuration of a projector, a sensor, a central processing unit, and a display image.

FIG. 1 is a diagram illustrating an example configuration 100 of a projector 110, a display surface 120, an augmented reality controller 130, and a sensor 140. In the illustrated example of FIG. 1, the example projector 110 projects an image onto the example display surface 120. The example augmented reality controller 130 controls the image projected by the example projector 110 based on information retrieved from the example sensor 140.

The example projector 110 of the illustrated example of FIG. 1 is implemented by a digital light processing (DLP) projector. However, any other projection technology may additionally or alternatively be used such as, for example, liquid crystal on silicon (LCoS), a liquid crystal display (LCD), light emitting diode (LED) projection, laser projection, etc. While in the illustrated example of FIG. 1 a projector is used to project an image onto the display surface 120, any other approach to presenting an image at a display surface may additionally or alternatively be used. For example, a television screen may be used to present an image.

The example display surface 120 of the illustrated example of FIG. 1 is represented as a horizontal display surface (e.g., a tabletop, a floor, etc.) However, any other type of display surface may additionally or alternatively be used. For example, the example display surface 120 may be implemented as a vertical display surface such as, for example, a wall, a television mounted on a wall, etc.

The example augmented reality controller 130 is implemented by a computing system including, for example, memory and a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. An example approach to implementing the augmented reality controller 130 is described in further detail below in connection with FIGS. 3 and/or 4. As noted above, the example augmented reality controller 130 receives sensor data from the sensor 140, processes the sensor data to determine a location of a user and/or user(s) of the augmented reality system, and controls the display of the projector 110 to present an augmented reality interface to the user.

The example sensor 140 of the illustrated example of FIG. 1 is an image sensor. However, in some examples, the sensor 140 may be augmented with distance sensing capabilities, such as, for example, an Intel® RealSense™ depth camera. However, any other type of image sensing device may additionally or alternatively be used such as, for example, a charge-coupled device (CCD) sensor, a complementary metal-oxide-semiconductor (CMOS), a red green blue distance (RGB-D) sensor, etc.

Figure 2:
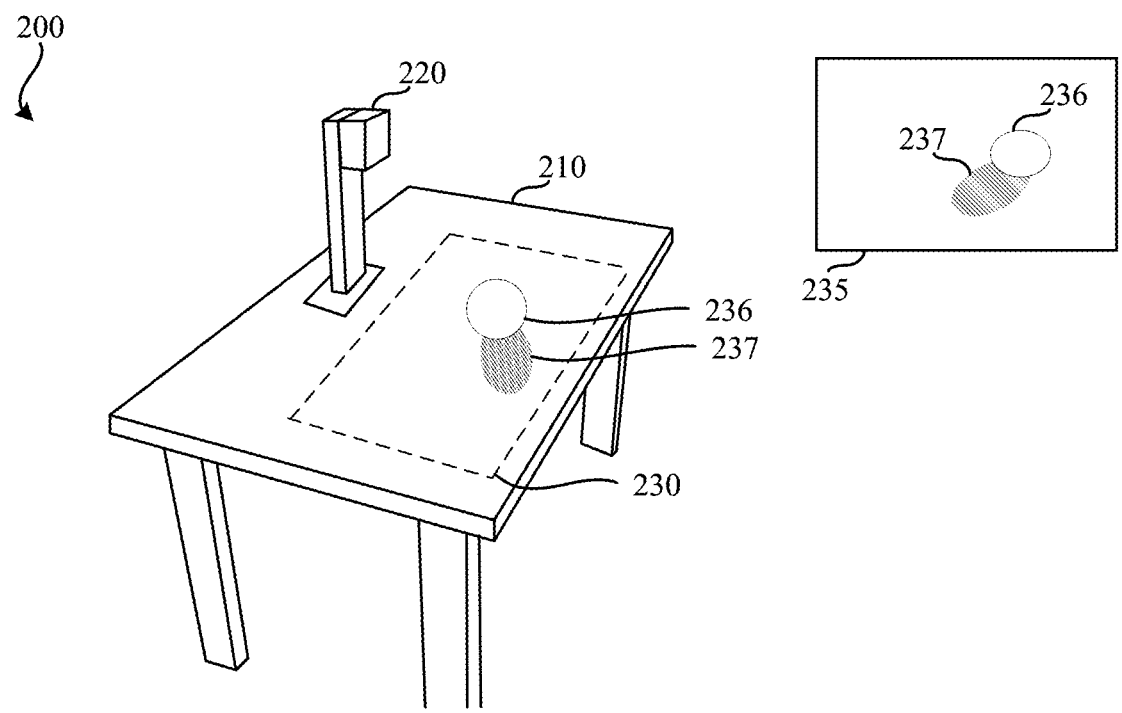
FIG. 2 is an example environment of use including an augmented reality system.

FIG. 2 is an example environment of use 200 including an augmented reality system. The example environment of use 200 includes a display surface 210, a sensor 220, and a display area 230. The display area 230 enables display of an image 235 to the user that is based on the vantage point of the user. In the illustrated example of FIG. 2, the display surface 210 is a table top. However, any other display surface may additionally or alternatively be used.

In the illustrated example of FIG. 2, the sensor 220 (representing the sensor 140 of FIG. 1) has a position that is fixed with respect to the display surface 210. However, in some examples, the sensor 220 may be movable with respect to the display surface 210. In such an example, the sensor 220 may need to be positioned such that the sensor (and/or the example augmented reality controller 130 connected thereto) is able to determine a position of the sensor relative to the display area 230.

In the illustrated example of FIG. 2, the display area 230 represents a portion of the display surface 210. However, in some examples, the display area 230 may represent an entirety of the display surface and/or may include multiple different display surfaces. In some examples, those multiple display surfaces might not necessarily be co-planar with each other. For example, a first display surface may be a table top while a second display surface may be a wall that is perpendicular to the tabletop.

In the illustrated example of FIG. 2, the example display area 230 displays an image (represented by the image 235). In the illustrated example of FIG. 2, the image 235 includes a ball 236 suspended over the display surface 210. The ball 236 casts a shadow 237 (virtually) onto the display surface 210. In the illustrated example of FIG. 2, the image is generated based on the user's perspective to include the ball 236 and the shadow 237. Thus, the ball 236 and the shadow of the ball 237 are distorted to provide an image having a three-dimensional look and feel to the user.

Figure 3:
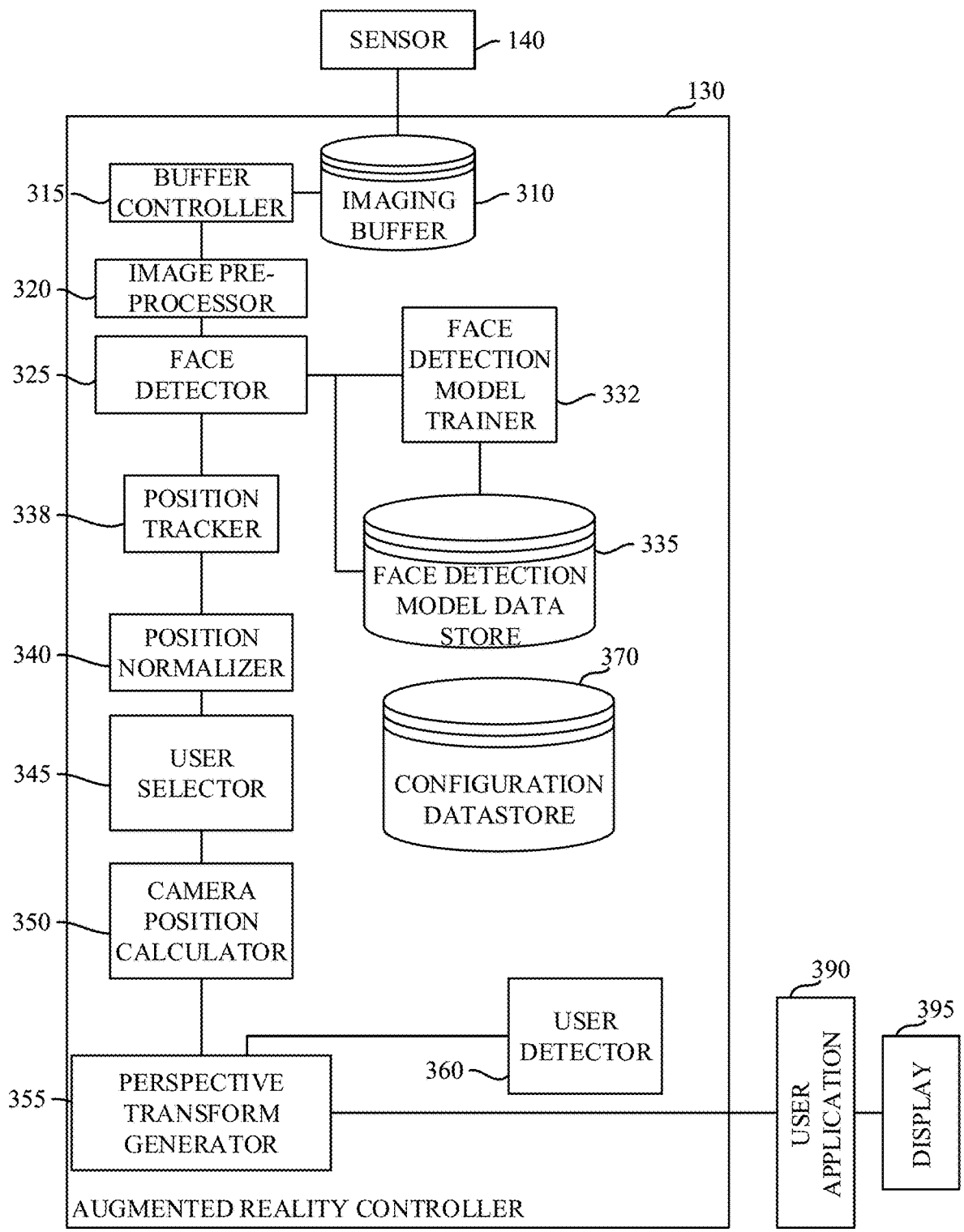
FIG. 3 is a block diagram of an example implementation of the augmented reality controller of the example augmented reality system of FIG. 1.

FIG. 3 is a block diagram of an example implementation of the augmented reality controller 130 of the example augmented reality system of FIG. 1. The example augmented reality controller 130 of the illustrated example of FIG. 3 includes an imaging buffer 310, a buffer controller 315, an image preprocessor 320, a face detector 325, a position tracker 338, a face detection model trainer 332, a face detection model data store 335, a position normalizer 340, a user selector 345, a camera position calculator 350, a perspective transform generator 355, a user detector 360, and the configuration data store 370. The example imaging buffer 310 receives data from the example sensor 140 of the illustrated example of FIG. 1. The example perspective transform generator 355 communicates with a user application 390 which interfaces with a display 395 (e.g., the projector 110 of the illustrated example of FIG. 1).

The example imaging buffer 310 of the illustrated example of FIG. 3 is implemented by any memory, storage device and/or storage disc for storing data such as, for example, flash memory, magnetic media, optical media, etc. Furthermore, the data stored in the example imaging buffer 310 may be in any data format such as, for example, binary data, comma delimited data, tab delimited data, structured query language (SQL) structures, etc. While in the illustrated example the imaging buffer 310 is illustrated as a single element, the imaging buffer 310 and/or any other data storage elements described herein may be implemented by any number and/or type(s) of memories. In the illustrated example of FIG. 3, the example imaging buffer 310 stores image data received from the example sensor 140. The example buffer controller 315 controls data stored in the example imaging buffer 310.

The example buffer controller 315 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example buffer controller 315 queries the sensor 140 for data. The data is delivered to the example imaging buffer 310. In examples disclosed herein, a stack-buffering technique is used to allow the sensor 140 to fill the imaging buffer 310 with the latest data while main processing occurs, as such main processing may occur at a rate that is slower than the frame rate of the sensor 140.

For example, as the example imaging buffer 310 receives the data from the sensor 140, the example buffer controller 315 moves a stack top (e.g., a pointer, a flag, etc.) to this new data when the data has been fully written. The location of the old (e.g., prior) stack top is then released if that data is not actively being processed (e.g., by the pre-processor 320). That is, the example buffer controller 315 determines whether the prior stack top is currently being processed, and in response to determining that the prior stack top is not currently being processed, the data at the prior stack top location is released. In this manner, unused old data stored in the example imaging buffer 310 is released.

Likewise, while data is being processed, the example buffer controller 315 marks the stack top as actively being processed. The example buffer controller provides the data at the stack top the image pre-processor 320 without copying from the buffer. That is, direct access to the stack top is provided to the image pre-processor 320 by the example buffer controller 315. Upon completion of the pre-processing by the example image pre-processor 320, the example buffer controller 315 unmarks the stack top, and causes the stack top to be released. That is, once that data has been processed, it is released to allow that memory location (e.g., the imaging buffer 310) to be used for other subsequent incoming data from the sensor 140.

The example image pre-processor 320 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example image pre-processor 320 processes the image (e.g., the image data stored in the example imaging buffer 310) to prepare the image for face detection. In examples disclosed herein, the example pre-processing may include, for example, adjusting contrast and/or brightness settings of the image, cropping the image, reversing the image, etc. In some examples, such preprocessing may be omitted if, for example, the sensor 140 is configured to perform such preprocessing instead.

The example face detector 325 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example face detector 325 detects faces in the pre-processed image. In examples disclosed herein, the face detection logic of the face detector 325 is implemented as a cascading classifier. However, in some examples, a convolutional neural network (CNN) is used. The cascading classifier approach used by the Intel Photography Vision Library (PVL) provides an optimized and accelerated host-based method, while the CNN approach allows for an accelerated pathway using, for example, the Intel Movidius™ Myriad™ series of application specific integrated circuit (ASIC). Using either approach, only high confidence results (e.g., results having a threshold level of confidence) are returned. The output of the face detector 325 is an array of detected faces, and bounding rectangle coordinates of each face. Each face is assigned an identifier and tracked using, for example, a k-nearest neighbor (KNN) approach, a Discriminative Scale Space Tracking (DSST) approach, etc.

In some examples, the example face detector 325 labels the faces utilizing the face detection model trainer 332 and/or a face detection model stored the example face detection model data store 335 to perform the face recognition. The example face detector 325 applies labels to the faces to enable tracking of the identified faces over time.

The example face detection model trainer 332 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example face detection model trainer 332 trans the model stored in the example face detection model data store 335. To do so, the example face detection model trainer 332 generates a training data set and a validation data set. In examples disclosed herein, the training set is generated by capturing detected face region image data of sufficient quantity to generate a reliable fully connected layer set. In some examples, this data is enhanced using data augmentation techniques (e.g., image flipping, crops, translations, etc.) to synthetically increase the training set and improve model accuracy. In examples disclosed herein, each face region image data set also results in creation of a validation image set that can be used to test the accuracy of the generated model.

The example face detection model trainer 332 creates a local copy of the existing model stored in the example face detection model data store 435. As a result, the existing model is able to be used for inference while training occurs. The example face detection model trainer 332 loads a base model and weights.

The example face detection model trainer 332 then trains the model stored in the face detection model data store 335. In some examples, the face detection model trainer 332 is implemented using separate hardware from the face detector 325. Thus, training occurs on a separate processing unit than where the utilization of the generated model is performed. In such an example, such training may be performed on hardware that is optimized for training tasks such as, for example, a graphics processing unit (GPU). Thus, the example face detection model trainer 332, in some examples, may be implemented by a GPU. In some examples, the use of the trained model (e.g., by the face detector 325) may be implemented using, for example, a Movidius™ Myriad™ vision processing unit (VPU). In examples disclosed herein, stochastic gradient descent approaches are used to train the model. However, any other approach to training a model may additionally or alternatively be used.

Using the trained model, the example face detection model trainer 332 determines an error rate based on the model and the training data. The example face detection model trainer 332 determines whether the error rate is below an error threshold (e.g., less than a 2% error rate). However, any other error threshold may additionally or alternatively be used. If the model does not result in an error rate that satisfies (e.g., is less than or equal to) the error threshold, training is continued until the error rate satisfies the error threshold. When the example face detection model trainer 332 determines that the error rate satisfies the error threshold, the example face detection model trainer 432 stores the trained model in the face detection model data store 435 in places of the previously existing model.

The example face detection model data store 335 of the illustrated example of FIG. 3 is implemented by any memory, storage device and/or storage disc for storing data such as, for example, flash memory, magnetic media, optical media, etc. Furthermore, the data stored in the example face detection model data store 335 may be in any data format such as, for example, binary data, comma delimited data, tab delimited data, structured query language (SQL) structures, etc. While in the illustrated example the face detection model data store 335 is illustrated as a single element, the face detection model data store 335 and/or any other data storage elements described herein may be implemented by any number and/or type(s) of memories. In the illustrated example of FIG. 3, the example face detection model data store 335 stores the face detection model used by the face detector 325 to detect faces in images. In examples disclosed herein, the example face detection model trainer 332 stores the model in the example face detection model data store 335.

The example position tracker 338 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example position tracker determines an approximate eye position based on the location of the detected face. The example position tracker 338 identifies a vertical centerline of a face bounding rectangle. In examples disclosed herein, the example position tracker 338 identifies the vertical centerline by finding a line that is intermediate a left edge of the face bounding rectangle and a right edge of the face bounding rectangle.

The example position tracker 338 identifies a horizontal line representing one-third of the vertical measure from the top bounding line of the face bounding rectangle. In examples disclosed herein, the example position tracker 338 identifies the horizontal line by finding a line that is one-third of the distance from a top edge of the face bounding rectangle and a bottom edge of the face bounding rectangle. However, any other ratio for finding a horizontal line may additionally or alternatively be used. The example position tracker 338 calculates an intersection of the vertical centerline and the horizontal line to determine the estimated eye position.

The example position normalizer 340 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. Based on properties of the sensor 140 (e.g., whether a distortion correction algorithm is applied at the sensor, whether the sensor meets a threshold resolution, etc.) the example position normalizer 340 selects an approach for normalizing the estimated eye position. For example, if the example sensor uses a low distortion lens with a high-resolution sensor, the example position normalizer 340 performs a linear interpolation to determine the eye position with respect to the center point of the sensor field-of-view. For lenses with accentuated or asymmetric distortion that are not corrected via pre-processing distortion, the example position normalizer 340 uses spline interpolation of certain sensor pixel intervals to minimize error rates in angular estimation.

The example user selector 345 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example user selector 345 tracks faces that are identified in the sensor data to determine whether a particular face should be identified as the active user. Using such information, the example user selector 345 selects an active user, and passes the position of the active user to the example camera position calculator 350. In some examples, multiple active users may be identified.

The example camera position calculator 350 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example camera position calculator 350 calculates a position of the anamorphic camera. In some examples, the calculation of the position of the camera is based on whether distance information is provided by the sensor 140. For example, if distance information is provided by the sensor, such distance information may be used in a variable distance position determination. Alternatively, if no distance information is provided, the example camera position calculator 350 may use a fixed radius position determination.

The example perspective transform generator 355 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example perspective transform generator 355 transforms the position of the anamorphic camera (e.g., the user's vantage point) to a position in the 3D space used of the user application 390. In some examples, the perspective transform generator 355 rotates and/or adjusts the position(s) of the camera to provide a corrected stereoscopic effect to the user.

The example user detector 360 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. In some examples, the augmented reality controller 130 may support multiple active users. In such an example, the example user detector 360 determines whether multiple active users are present, and selects an appropriate display mode.

The example configuration data store 370 of the illustrated example of FIG. 3 is implemented by any memory, storage device and/or storage disc for storing data such as, for example, flash memory, magnetic media, optical media, etc. Furthermore, the data stored in the example configuration data store 370 may be in any data format such as, for example, binary data, comma delimited data, tab delimited data, structured query language (SQL) structures, etc. While in the illustrated example the configuration data store 370 is illustrated as a single element, the configuration data store 370 and/or any other data storage elements described herein may be implemented by any number and/or type(s) of memories. In the illustrated example of FIG. 3, the example configuration data store 370 stores information used by the components of the example augmented reality controller 130. Such information may include, for example, position information that identifies the position of components of the augmented reality system (e.g., the sensor, the display surface, the display, etc.) in relation to one another. In some examples, various thresholds are stored in the example configuration datastore such as, for example, a threshold number of active users, an error threshold used for face detection, etc.

The example user application 390 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. In some examples, the user application 390 may be implemented by instructions that, when executed, cause a logic circuit (e.g., a hardware processor) to implement an augmented reality user interface such as, for example, a modeling application, a mapping application, a video game, etc.

The example display 395 of the illustrated example of FIG. 3 is implemented by a digital light processing DLP projector. However, any other display technology may additionally or alternatively be used such as, for example, liquid crystal on silicon (LCoS), a liquid crystal display (LCD), light emitting diode (LED) projection, laser projection, etc. In the illustrated example of FIG. 3 a projector is used to project an image onto a display surface (e.g., the display surface 120 of FIG. 1). However, any other approach to presenting an image at a display surface may additionally or alternatively be used. For example, a television screen may be used to present an image.

Figure 4:
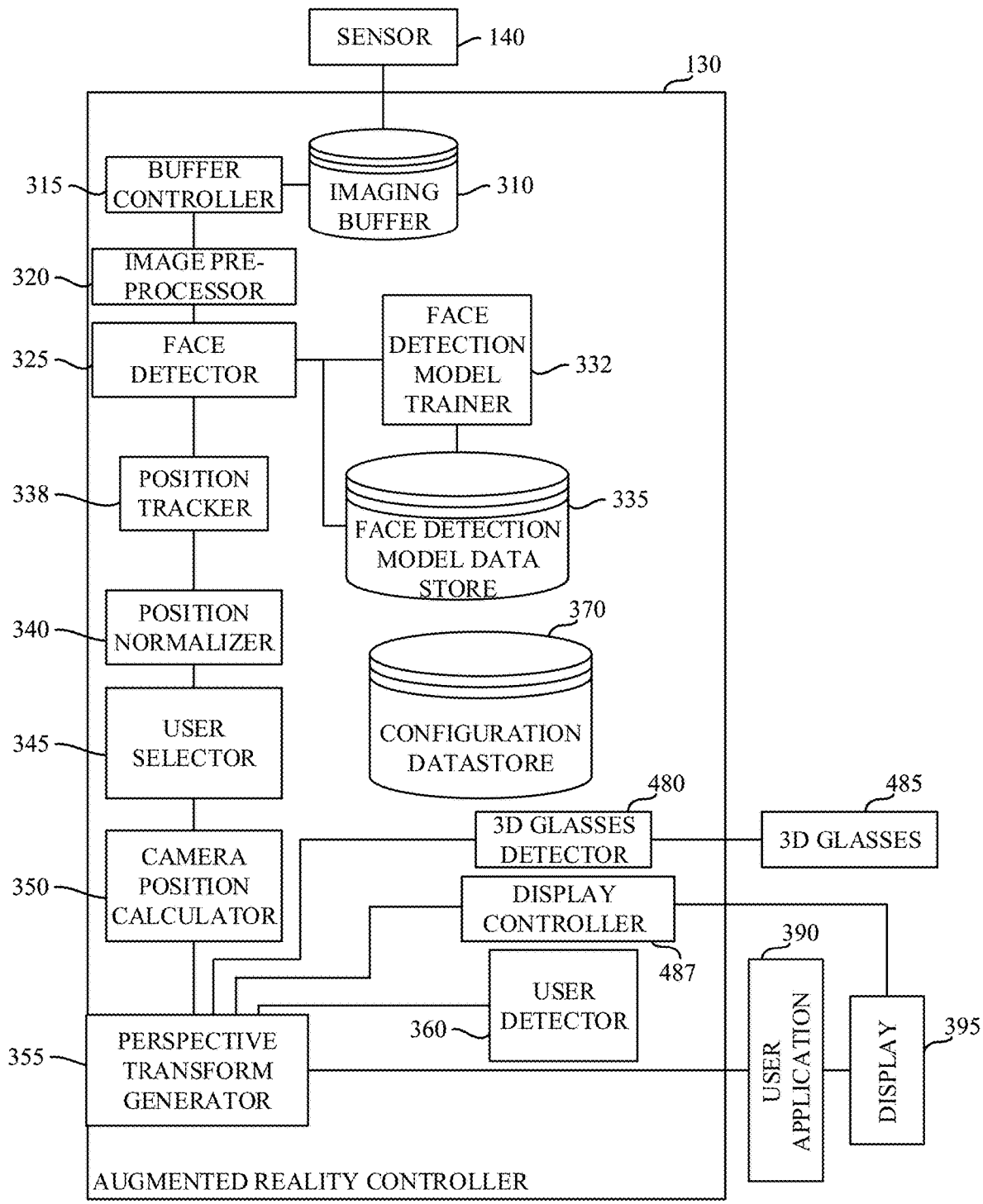
FIG. 4 is a block diagram of an example alternative implementation of the example augmented reality controller of the example augmented reality system of FIG. 1.

FIG. 4 is a block diagram of an example alternative implementation of the example augmented reality controller 130 of the example augmented reality system of FIG. 1. As compared with the example augmented reality system 130 of the illustrated example of FIG. 3, the example augmented reality controller 130 of the illustrated example of FIG. 4 additionally includes a 3D glasses detector 480 that interacts with 3D glasses 485 and a display controller 487 that interacts with the display 395.

The example 3D glasses detector 480 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example 3D glasses detector 480 determines whether multiple users are present for determination of a display mode. In examples disclosed herein, the example 3D glassed detector 480 determines whether multiple users are detected by interacting with nearby 3D glasses (e.g., the 3D glasses 485) to determine how many pairs of 3D glasses are being worn by users. However, any other approach to determining whether multiple users are present may additionally or alternatively be used such as, for example, analysis of image data from the sensor 140 to determine whether multiple faces are detected.

The example 3D glasses 485 of the illustrated example of FIG. 4 are head-mounted 3D glasses that enable a user to view a stereoscopic presentation. In examples disclosed herein, the 3D glasses 485 are actively shuttered glasses, where the shutters can be controlled to permit a particular eye of the user to view a presented image. In some examples, multiple pairs of 3D glasses 485 may be used by multiple users. In such examples, the 3D glasses may not be used for a stereoscopic effect, but instead to create an isolation effect. That is, images presented to one user can be isolated from presentation to another user by controlled shuttering of the lenses.

The example display controller 487 of the illustrated example of FIG. 4 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example display controller 487 interacts with the example display 395 to control the display of content via the 3D glasses.

While an example manner of implementing the example augmented reality controller 130 of FIG. 1 is illustrated in FIGS. 3 and/or 4, one or more of the elements, processes and/or devices illustrated in FIGS. 3 and/or 4 may be combined, divided, re-arranged, omitted, eliminated and/or implemented in any other way. Further, the example imaging buffer 310, the example buffer controller 315, the example image pre-processor 320, the example face detector 325, the example face detection model trainer 332, the example face detection model data store 335, the example position tracker 338, the example position normalizer 340, the example user selector 345, the example camera position calculator 350, the example perspective transform generator 355, the example user detector 360, the example configuration data store 370, the example 3D glasses detector 480, the example display controller 487, and/or, more generally, the example augmented reality controller 130 of FIGS. 3 and/or 4 may be implemented by hardware, software, firmware and/or any combination of hardware, software and/or firmware. Thus, for example, any of the example imaging buffer 310, the example buffer controller 315, the example image pre-processor 320, the example face detector 325, the example face detection model trainer 332, the example face detection model data store 335, the example position tracker 338, the example position normalizer 340, the example user selector 345, the example camera position calculator 350, the example perspective transform generator 355, the example user detector 360, the example configuration data store 370, the example 3D glasses detector 480, the example display controller 487, and/or, more generally, the example augmented reality controller 130 of FIGS. 3 and/or 4 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example imaging buffer 310, the example buffer controller 315, the example image pre-processor 320, the example face detector 325, the example face detection model trainer 332, the example face detection model data store 335, the example position tracker 338, the example position normalizer 340, the example user selector 345, the example camera position calculator 350, the example perspective transform generator 355, the example user detector 360, the example configuration data store 370, the example 3D glasses detector 480, the example display controller 487, and/or, more generally, the example augmented reality controller 130 of FIGS. 3 and/or 4 is/are hereby expressly defined to include a non-transitory computer-readable storage device or storage disk such as a memory, a digital versatile disk (DVD), a compact disk (CD), a Blu-ray disk, etc. including the software and/or firmware. Further still, the example augmented reality controller 130 of FIGS. 3 and/or 4 may include one or more elements, processes and/or devices in addition to, or instead of, those illustrated in FIGS. 3 and/or 4, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine-readable instructions, hardware implemented state machines, and/or any combination thereof for implementing the example augmented reality controller 130 of FIGS. 3 and/or 4 are shown in FIGS. 5, 6, 7, 9, 10, 11, 13, 17, 20, 23, and/or 31. The machine-readable instructions may be an executable program or portion of an executable program for execution by a computer processor such as the processor 3712 shown in the example processor platform 3700 discussed below in connection with FIG. 37. The program may be embodied in software stored on a non-transitory computer-readable storage medium such as a CD-ROM, a floppy disk, a hard drive, a DVD, a Blu-ray disk, or a memory associated with the processor 3712, but the entire program and/or parts thereof could alternatively be executed by a device other than the processor 3712 and/or embodied in firmware or dedicated hardware. Further, although the example program is described with reference to the flowchart illustrated in FIGS. 5, 6, 7, 9, 10, 11, 13, 17, 20, 23, and/or 31, many other methods of implementing the example augmented reality controller 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5, 6, 7, 9, 10, 11, 13, 17, 20, 23, and/or 31 may be implemented using executable instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer-readable storage device and/or storage disk and to exclude propagating signals and to exclude transmission media.

"Including" and "comprising" (and all forms and tenses thereof) are used herein to be open-ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open-ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

Figure 5:
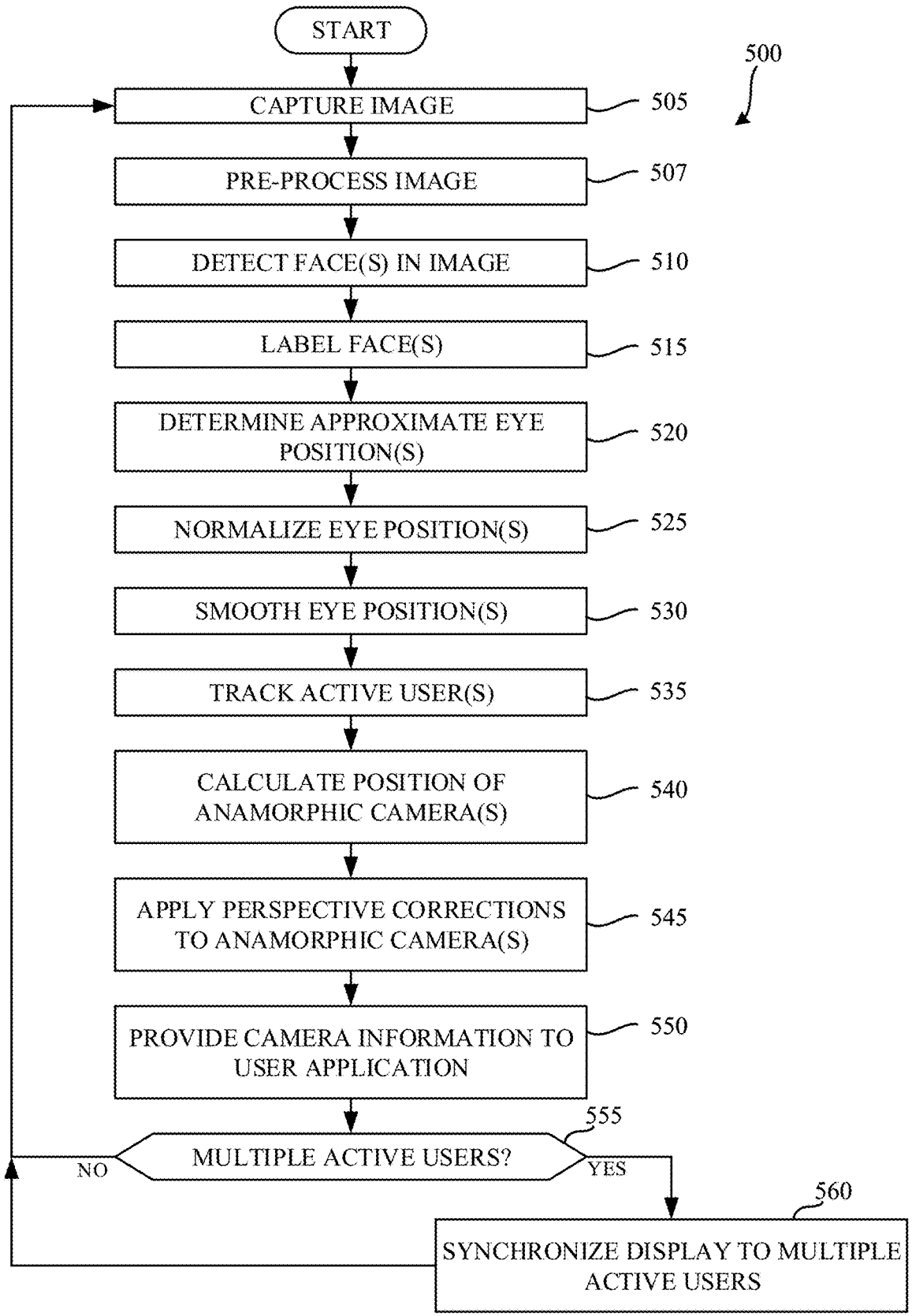
FIG. 5 is a flowchart representative of machine readable instructions that may be executed to implement the example augmented reality controller of FIGS. 3 and/or 4.

FIG. 5 is a flowchart representative of machine readable instructions that may be executed to implement the example augmented reality controller of FIGS. 3 and/or 4. The example process 500 of the illustrated example of FIG. 5 begins when the example buffer controller 315 gathers image data from the sensor 140. (Block 505). An example approach for gathering data from the sensor 140 is described in connection with FIGS. 6, 7, and/or 8, below.

Using the gathered image data, the example pre-processor 320 processes the image to prepare the image for face detection. (Block 507). In examples disclosed herein, the example pre-processing may include, for example, adjusting contrast and/or brightness settings of the image, cropping the image, reversing the image, etc. In some examples, such preprocessing may be omitted if, for example, the sensor 140 is configured to do such preprocessing instead.

The example face detector 325 then detects faces in the image. (Block 510). In examples disclosed herein, the face detection logic is implemented as a cascading classifier. However, in some examples, a convolutional neural network (CNN) is used. The cascading classifier approach used by the Intel Photography Vision Library (PVL) provides an optimized and accelerated host-based method, while the CNN approach allows for an accelerated pathway using, for example, the Intel Movidius™ Myriad™ series of application specific integrated circuit (ASIC). Using either approach, only high confidence results (e.g., results having a threshold level of confidence) are returned. The output of the face detector 325 is an array of detected faces, and bounding rectangle coordinates of each face. Each face is assigned an identifier and tracked using, for example, a k-nearest neighbor (KNN) approach, a Discriminative Scale Space Tracking (DSST) approach, etc.

The example face detector 325 then labels the faces. (Block 515). In some examples, the face detector 325 utilizes the face detection model trainer 332 and/or a face detection model stored the example face detection model data store 335 to perform the face recognition. The example face detector 325 applies labels to the faces to enable tracking of the identified faces over time. An example approach for labeling of the faces is disclosed in further detail in connection with FIGS. 9 and/or 10, below.

The example position tracker 338, utilizing the labeled faces and/or the bounding rectangles of those labeled faces, determines an approximate eye position for each of the users corresponding to those identified faces. An example approach for determining an amount an approximate eye position is disclosed in further detail in connection with FIGS. 11 and/or 12, below.

Figure 14:
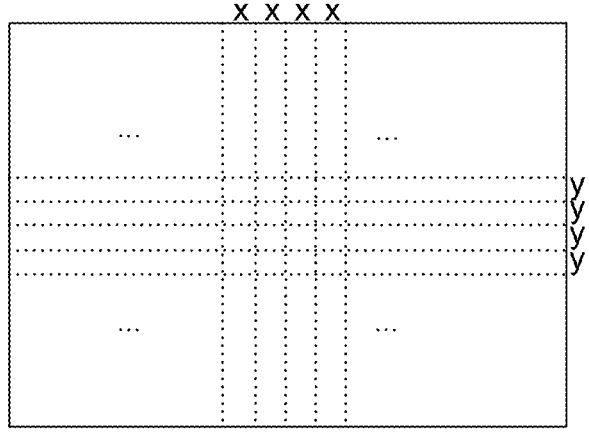
FIGS. 14, 15, and 16 are diagrams representing approaches for interpolating positions in an image.
Figure 15:
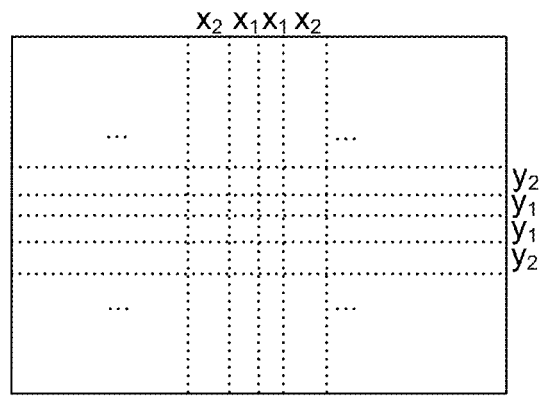

Using the approximate eye positions, the example position normalizer 340 normalizes those eye positions. (Block 525). An example approach to such normalization is described below in connection with FIGS. 13, 14, 15, and/or 16. The example position normalizer 340 then smooths the positions of those smooths the normalized eye positions. (Block 530). In examples disclosed herein, to minimize jitter and rounding error effects, an exponential smoothing is applied to each normalized eye position. However, any other type of smoothing function may additionally or alternatively be applied. In examples disclosed herein, the effective frame update frequency and desired damping normalized value radius is used to generate alpha values for the exponential smoothing function, ensuring high impulse response for large changes and low impulse for changes small changes (e.g., changes within a normalized value radius).

The example user selector 345 then tracks an active user from the identified faces and smoothed eye positions. (Block 535). This enables particular vantage points (e.g., the vantage point of the active user) to be selected for subsequent position calculations and/or transformations. An example approach to tracking an active user is described below in connection with FIG. 17.

The example camera position calculator 350 then calculates a position of an anamorphic camera for the active user(s). (Block 540). An example approach to calculating a position of an anamorphic camera is disclosed in further detail in connection with FIGS. 19, 20, 21, and/or 22, below. As used herein, an anamorphic camera represents a position of a user within a 3D space. Using the position of the anamorphic cameras, the perspective transform generator 355 applies perspective corrections. (Block 545). An example approach to applying a perspective correction to an anamorphic camera is disclosed below in connection with FIGS. 23, 24, 25, 26, 27, 28, 29, and/or 30.

The example perspective transform generator 355 then provides the camera information to the user application 390. (Block 550). In this manner, the user application 390 can appropriately position a virtual camera representing the vantage point of the user within the 3D space.

In some examples, the augmented reality controller 130 may support multiple active users. In such an example, the example user detector 360 determines whether multiple active users are present. (Block 555). If the example user detector 360 determines that multiple active users are not present (e.g., block 555 returns a result of NO), control proceeds to block 505 where the example process of blocks 505-555 are repeated. If the example user detector 360 determines that there are multiple active users (e.g., block 555 returns a result of YES), the example display controller 487 of FIG. 4 operates with the display 395 to synchronize the display to those multiple active users, and their corresponding vantage points. (Block 560). An example approach for synchronizing the display to those multiple active users is disclosed in further detail in connections with FIGS. 31, 32, 33, 34, 35, and/or 36, below. Control then proceeds to block 505 were the example process 500 the illustrated example of FIG. 5 is repeated.

Figure 6:
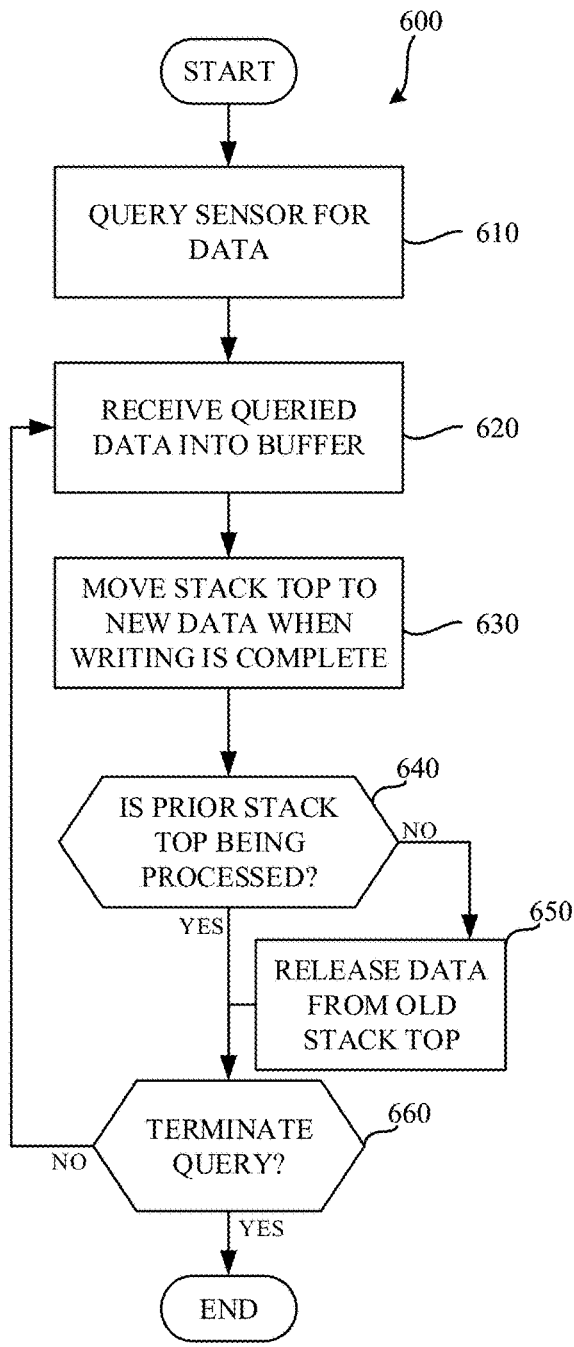
FIG. 6 is a flowchart representative of machine readable instructions which may be executed to implement the example augmented reality controller of FIGS. 2 and/or 3 to manage a buffer of incoming data from the sensor of FIGS. 3 and/or 4.

FIG. 6 is a flowchart representative of machine readable instructions which may be executed to implement the example augmented reality controller of FIGS. 2 and/or 3 to manage a buffer of incoming data from the sensor of FIGS. 3 and/or 4. The example process 600 the illustrated example of FIG. 6 begins when the example buffer controller 315 queries the sensor 140 for data. (Block 610). In examples disclosed herein, this data query happens in a parallel execution state from the main processing flow of FIG. 5, to ensure that the latest data image is readily available for pre-processing by the pre-processor 320. In other words, a stack-buffering technique is used to allow the sensor to fill a buffer with the latest data while main processing occurs, as such main processing may occur at a rate that is slower than the frame rate of the sensor 140.

The example imaging buffer 310 receives the data from the sensor 140. (Block 620). As new image data is added to the imaging buffer 310, a stack top (e.g., a pointer, a flag, etc.) is moved to this new data when the data has been fully written. (Block 630). The location of the old (e.g., prior) stack top is then released if that data is not actively being processed (e.g., by the pre-processor 320). That is, the example buffer controller 315 determines whether the prior stack top is currently being processed (block 640), and in response to determining that the prior stack top is not currently being processed (e.g., block 640 returning a result of NO), the data at the prior stack top location is released. (Block 650). In this manner, unused old data is released.

The example buffer controller 315 then determines whether to terminate query to the sensor 140. (Block 660). If the query to the sensor is not to be terminated (e.g., the operations of the example augmented reality controller are to continue) (e.g., block 660 returns a result of NO), control proceeds to block 620 were the imaging buffer 310 continues to receive data from the example sensor 140. If the query to the sensor is to be terminated (e.g., block 660 returns a result of YES), the example process 600 the illustrated example of FIG. 6 terminates.

Figure 7:
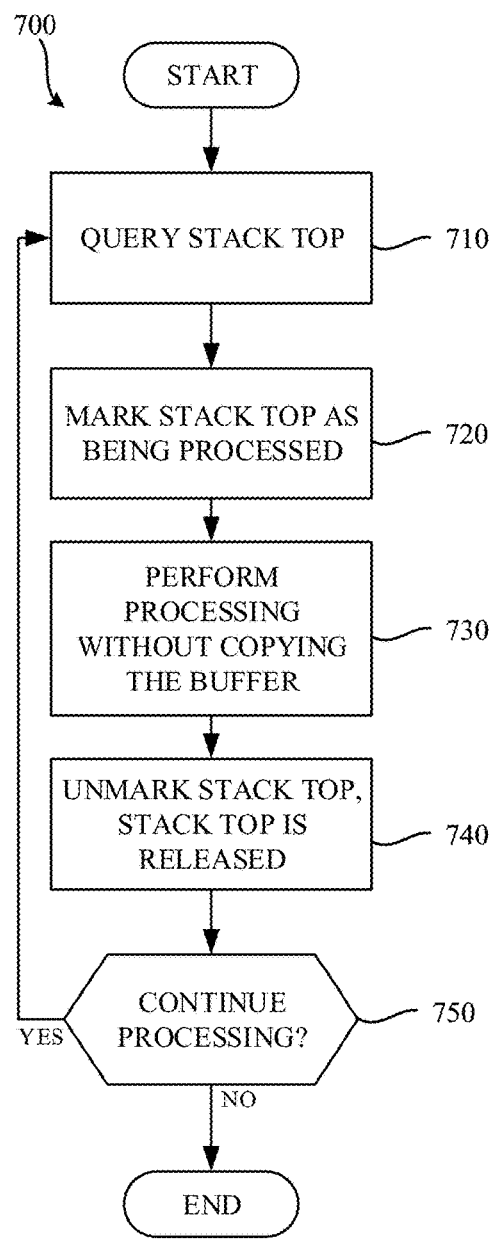
FIG. 7 is a flowchart representative of machine readable instructions which may be executed to implement the example augmented reality controller of FIGS. 2 and/or 3 to retrieve data from the buffer of incoming data managed by the example instructions of FIG. 5.

FIG. 7 is a flowchart representative of machine readable instructions which may be executed to implement the example augmented reality controller of FIGS. 2 and/or 3 to retrieve data from the buffer of incoming data managed by the example instructions of FIG. 5. The example process 700 the illustrated example of FIG. 7 begins when the example buffer controller 315 queries (and/or otherwise gathers) the stack top from the example imaging buffer 310. (Block 710). The example buffer controller marks the stack top as actively being processed. (Block 720). The example buffer controller provides the data at the stack top the image pre-processor 320 without copying from the buffer. (Block 730). That is, direct access to the stack top is provided to the image pre-processor 320 by the example buffer controller 315.

Upon completion of the pre-processing by the example image pre-processor 320, the example buffer controller 315 unmarks the stack top, and causes the stack top to be released. (Block 740). That is, once that data has been processed, it is released to allow that memory location to be used for other subsequent incoming data from the sensor 140. In some examples herein, the image data in the image buffer 310 is not released until completion of the face detection tasks by the example face detector (e.g., until block 510 of FIG. 5 is completed). In some examples, if training and/or re-training is required, a segment of detected faces is sent for training as a copy of the image data in a separate memory location.

The example buffer controller 315 then determines whether processing is to continue. (Block 750). If the processing is to continue (e.g., block 750 returns a result of YES), control proceeds to block 710 were the buffer imaging buffer 310 continues to receive data from the example sensor 140. If the processing is not to continue (e.g., block 750 returns a result of NO), the example process 700 the illustrated example of FIG. 7 terminates.

Figure 8:
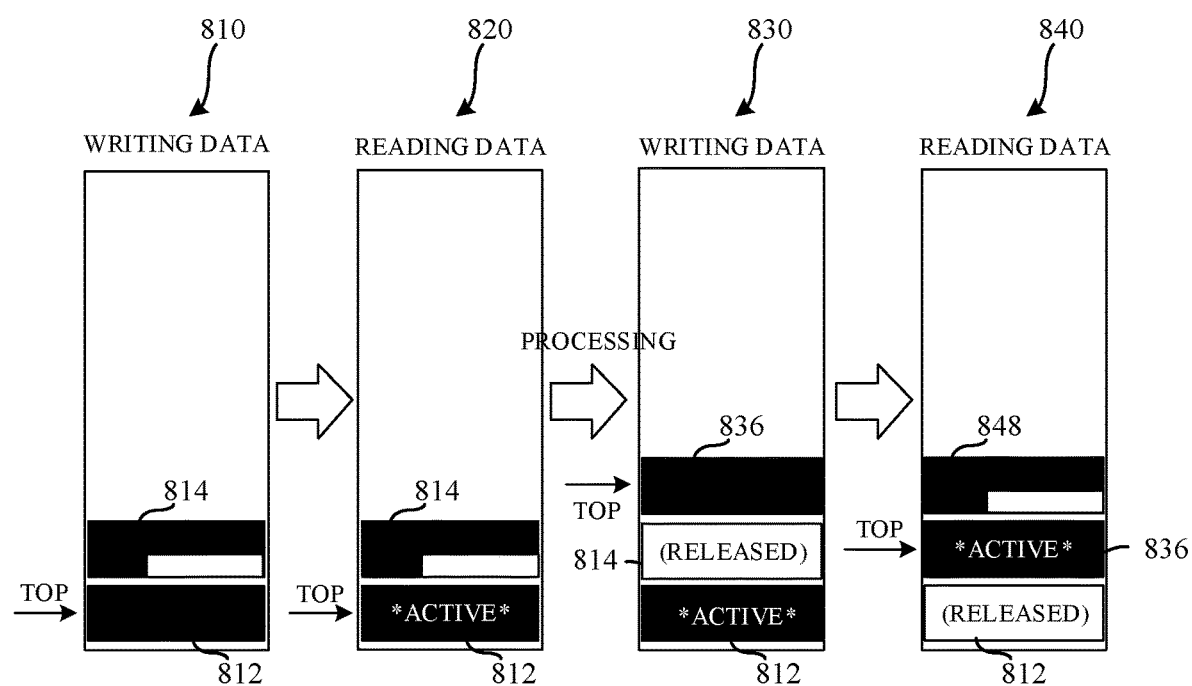
FIG. 8 is a diagram representing example buffer states for retrieval of incoming data.

FIG. 8 is a diagram representing example buffer states for retrieval of incoming data. In the illustrated example of FIG. 8, a first buffer state 810 represents the state of the buffer while data is incoming from the sensor 140, and no portions of the buffer have been marked as active. In the first example buffer state 810, a first section 812 of the buffer is marked as the stack top, while a second section of the buffer 814 is still receiving incoming data (e.g., the data stored in the second section 814 is incomplete).

At a time of transition from the example first buffer state 810 to a second buffer state 820, the first section 812 is marked as active. That is, the first section 812 is being processed by the example image pre-processor 320 (e.g., via block 730 of FIG. 7). Data continues to be streamed into the imaging buffer 310 by the example sensor 140.

At a time of transition from the second buffer state 820 to a third buffer state 830, a third section 836 of the buffer is marked as the stack top. The first section 812 is remains marked as the active section (e.g., the section that is being processed by the example image pre-processor 320). When the example third section 836 is marked as the stack top, the example second section 814 is released (see blocks 640 and 650 of FIG. 6).

At a time of transition from the third buffer state 830 to a fourth buffer state 840, processing is completed on the first section 812, and the stack top (e.g., the third example section 836) is marked as the active section. Data continues to be streamed into the imaging buffer 310 into a fourth example section 848. In this manner, memory requirements of the imaging buffer are kept to a minimum, as such memory accounts for the actively processed data, the most recent complete data from the sensor 140, and data currently being received from the sensor 140.

Figure 9:
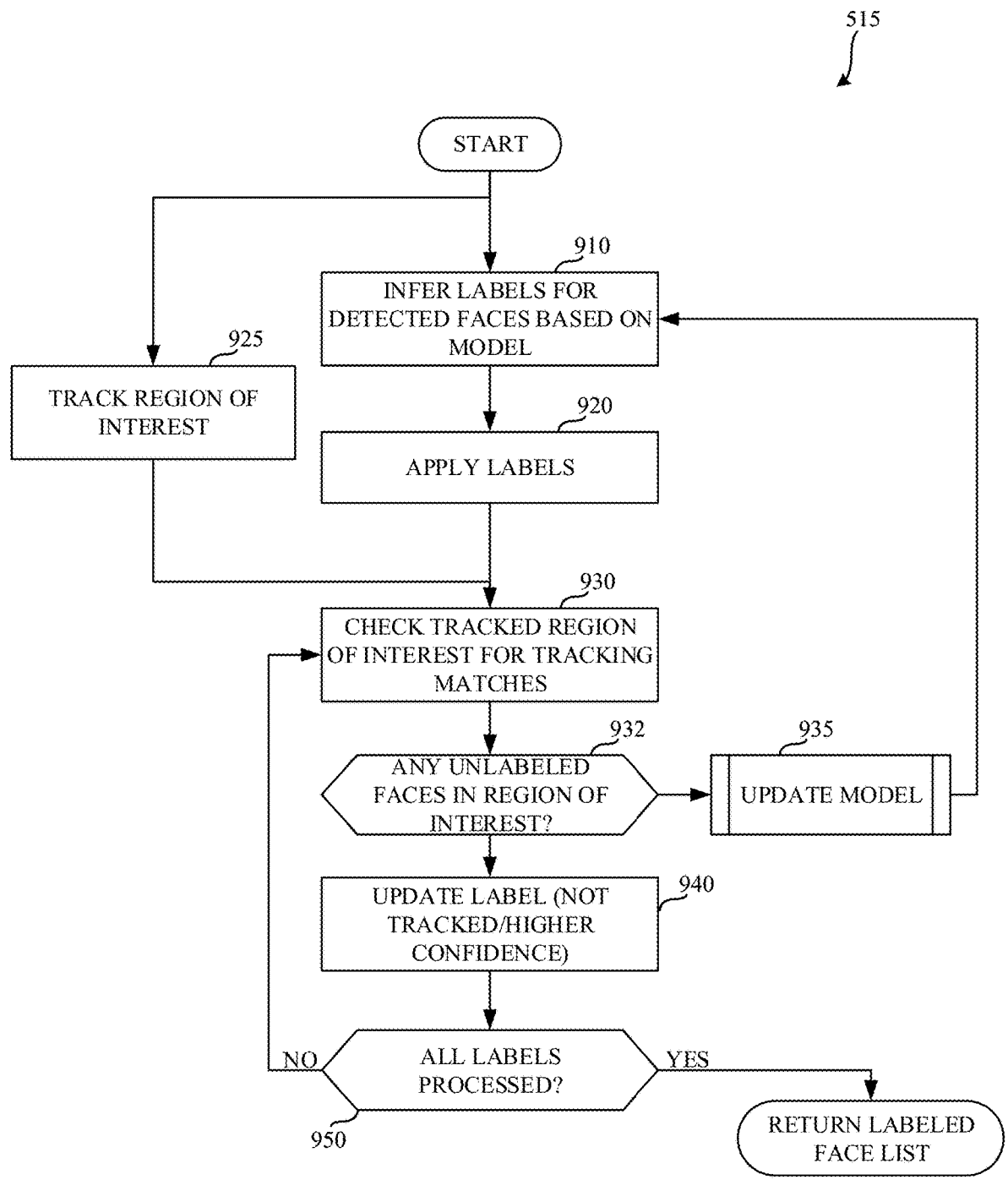
FIG. 9 is a flowchart representative of machine readable instructions which may be executed to implement the example augmented reality controller of FIGS. 3 and/or 4 to label faces in received image data.

FIG. 9 is a flowchart representative of machine readable instructions which may be executed to implement the example augmented reality controller 130 of FIGS. 3 and/or 4 to label faces in received image data. The example process 515 of the illustrated example of FIG. 9 begins when the example face detector 325 has detected faces in a pre-processed image. The example face detector 325 provides a list of face data identifying regions where faces were detected. In examples disclosed herein, the regions are identified by bounding rectangles corresponding to the faces identified in the image.

The example face detector 325 infers labels for each of the detected faces based on the face detection model stored in the example face detection model data store 335. (Block 910). In examples disclosed herein, the labelling is implemented using a convolutional neural network (CNN). In examples disclosed herein, the CNN is optimized at a basic level to perform face recognition in the hidden (convolutional and pooling) layers. However, any other type(s) of machine learning may additionally or alternatively be used to label faces. Fully connected layer(s) of the CNN and weights thereof are specific to the faces detected in a given session (a session controlled by device state in power, time, and detected faces), and are removed from the model and regenerated with each new training (the hidden layers weights remain). Such an approach substantially reduces the training time and resources used for such training. The example face detector 325 then applies the labels to the detected faces. (Block 920).

In the illustrated example of FIG. 9, in parallel with inferring the labels (block 910) and application of those labels (block 920), the example face detector 325 tracks a region of interest in the sensor data. (Block 925). While in the illustrated example of FIG. 9 such processing is performed in parallel, in some examples such processing may be performed in a serial fashion.

The example face detector 325 then analyzes the tracked region of interest to confirm that all such faces within the region of interest have been labeled. (Block 930). The example face detector 425 then determines whether any unlabeled faces exist in the region of interest. (Block 932). If unlabeled faces exist in the region of interest (e.g., block 932 returns a result of YES), the model used in connection with block 910 is updated to enable better identification of faces within the region of interest. (Block 935). In examples disclosed herein, the unlabeled regions are queued for updating of the model, until all tracks are assigned, and sufficient data is obtained to start model training. The model is updated for the next execution of block 910 when the updated model is available. The updating of the model does not block the return of face data. An example approach for updating the model is disclosed in further detail in connection with FIG. 10, below. Upon generation of the updated model, control proceeds to block 910 where the model is reapplied to detect faces in the image. The example process 515 then proceeds until there are no unlabeled faces in the region of interest (e.g., until block 932 returns a result of NO).

The example face detector 425 then updates the labels. (Block 940). In the process of matching, a label can only exist in one track at any given time. The highest confidence region with such label with a matching track will be assigned that label. Additionally, label and track "lifetime" values affect label assignment to prevent false updates and re-training of the model. The example face detector 325 then confirms that all labels have been processed. (Block 950). If not all labels have yet been processed (e.g., block 950 returns a result of NO), control proceeds to block 930. In response to confirming that all labels have been processed (e.g., block 950 returning a result of YES), the example process 515 of FIG. 9 terminates, and the matched and tracked face regions are then sent for further processing. In some examples, unlabeled face regions are also sent.

Figure 10:
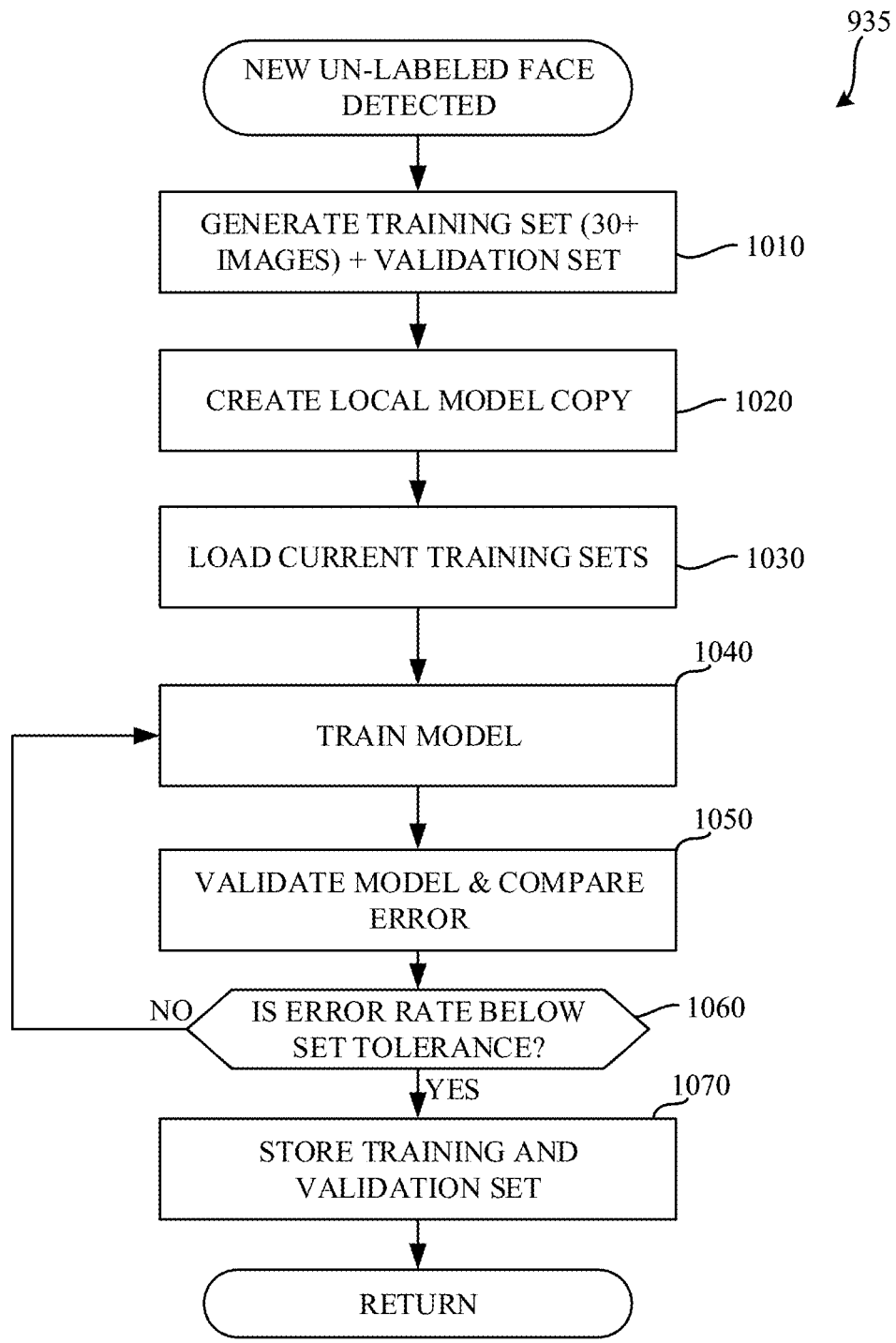
FIG. 10 is a flowchart representative of machine readable instructions which may be executed to implement the example augmented reality controller of FIGS. 3 and/or 4 to train a model for labeling a new un-labeled face.

FIG. 10 is a flowchart representative of machine readable instructions that may be executed to implement the example augmented reality controller of FIGS. 3 and/or 4 to train a model for labeling a new un-labeled face. If an existing model does not result in labeling of a face in a region of interest (e.g., if block 932 of FIG. 9 returns a result of NO), the example process 935 of FIG. 10 is executed. The example process 935 of FIG. 10 begins when the example face detection model trainer 332 generates a training set and a validation set. (Block 1010). In examples disclosed herein, the training set is generated by capturing detected face region image data of sufficient quantity to generate a reliable fully connected layer set. In some examples, this data is enhanced using data augmentation techniques (e.g., image flipping, crops, translations, etc.) to synthetically increase the training set and improve model accuracy. In examples disclosed herein, each face region image data set also results in the creation of a validation image set that can be used to test the accuracy of the generated model.

The example face detection model trainer 332 creates a local copy of the existing model stored in the example face detection model data store 435. (Block 1020). The example face detection model trainer 332 loads a base model and weights. In examples disclosed herein, the existing model is able to be used for inference while training occurs.

The example face detection model trainer loads the training set(s). (Block 1030). The example face detection model trainer 332 then trains the model stored in the face detection model data store 335. (Block 1040). In some examples, the training occurs on a separate processing unit than where the utilization of the generated model is performed. In such an example, such training may be performed on hardware that is optimized for training tasks such as, for example, a graphics processing unit (GPU). In such an example, the use of the trained model may be performed by, for example, a Movidius™ Myriad™ vision processing unit (VPU). In examples disclosed herein, stochastic gradient descent approaches are used to train the model. However, any other approach to training a model may additionally or alternatively be used.

Using the trained model, the example face detection model trainer 332 determines an error rate based on the model and the training data. (Block 1050). The example face detection model trainer 332 determines whether the error rate is below an error threshold (e.g., less than a 2% error rate). However, any other error threshold may additionally or alternatively be used. If the model does not result in an error rate that satisfies (e.g., is less than or equal to) the error threshold (e.g., block 1060 returns a result of NO), control proceeds to block 1040 where training is continued until the error rate satisfies the error threshold (e.g., until block 1060 returns a result of YES). When the example face detection model trainer 332 determines that the error rate satisfies the error threshold (e.g., when block 1060 returns a result of YES), the example face detection model trainer 432 stores the trained model in the face detection model data store 435 in places of the previously existing model. (Block 1070). The example process 935 of FIG. 10 then terminates and control returns to block 910 of FIG. 9.

Figure 11:
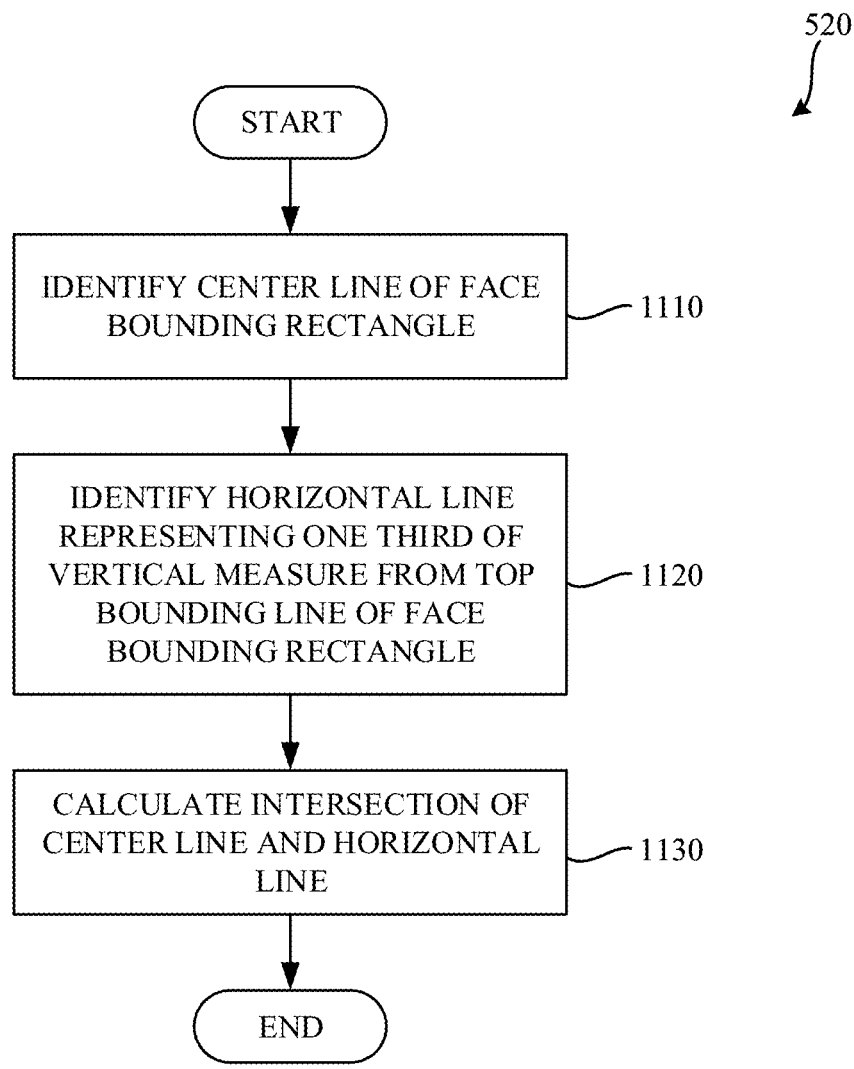
FIG. 11 is a flowchart representative of machine readable instructions which may be executed to implement the example augmented reality controller of FIGS. 3 and/or 4 to determine an approximate eye position.
Figure 12:
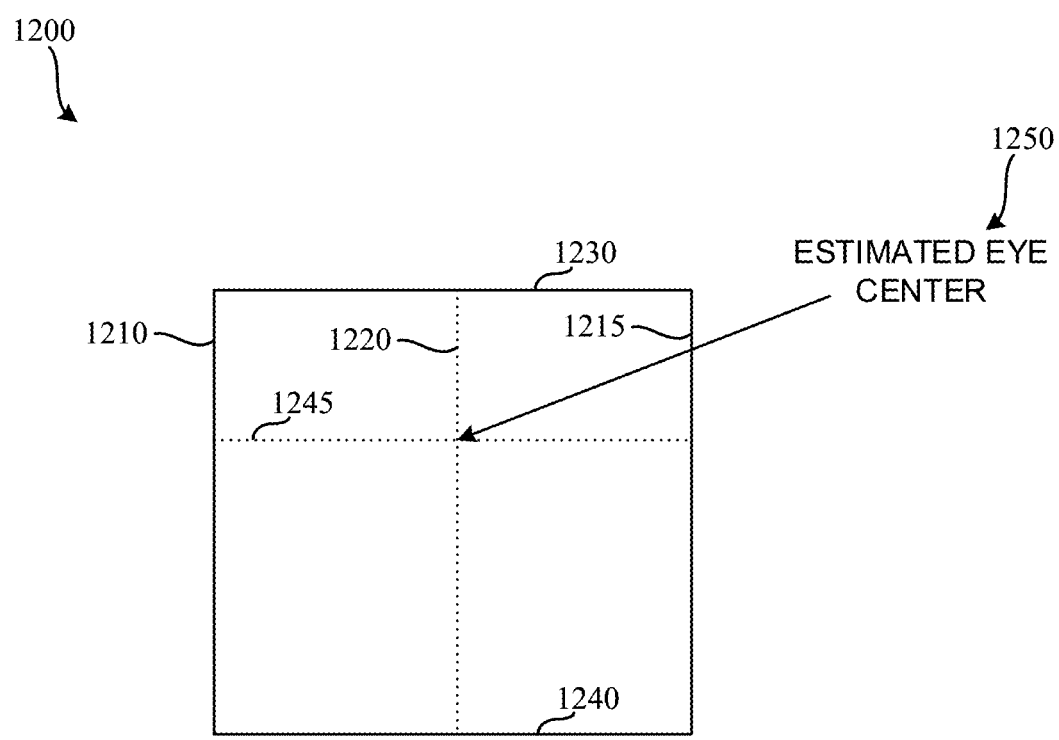
FIG. 12 is a diagram representing detection of an approximate eye position as performed by the example instructions of FIG. 11.

FIG. 11 is a flowchart representative of machine readable instructions which may be executed to implement the example augmented reality controller of FIGS. 3 and/or 4 to determine an approximate eye position. FIG. 12 is a diagram representing detection of an approximate eye position as performed by the example instructions of FIG. 11. The example diagram 1200 of the illustrated example of FIG. 12 represents a face bounding rectangle.

Returning to FIG. 11, the example process 520 the illustrated example of FIG. 11 begins when the example position tracker 338 identifies a vertical centerline of a face bounding rectangle (e.g., the face bounding rectangle of FIG. 12). (Block 1110). In examples disclosed herein, the example position tracker 338 identifies the vertical centerline (e.g., line 1220 of FIG. 12) by finding a line that is intermediate a left edge of the face bounding rectangle (e.g., line 1210 of FIG. 12) and a right edge of the face bounding rectangle (e.g., line 1215 of FIG. 12).

The example position tracker 338 then identifies a horizontal line representing one-third of the vertical measure from the top bounding line of the face bounding rectangle. (Block 1120). In examples disclosed herein, the example position tracker 338 identifies the horizontal line by finding a line (e.g., line 1245 of FIG. 12) that is one third of the distance from a top edge of the face bounding rectangle (e.g., line 1230 of FIG. 12) and a bottom edge of the face bounding rectangle (e.g., line 1240 of FIG. 12). However, any other ratio for finding a horizontal line may additionally or alternatively be used.

The example position tracker 338 then calculates an intersection of the vertical centerline and the horizontal line. (Block 1130). In the illustrated example of FIG. 12 the estimated eye center is represented as point 1250.

Figure 13:
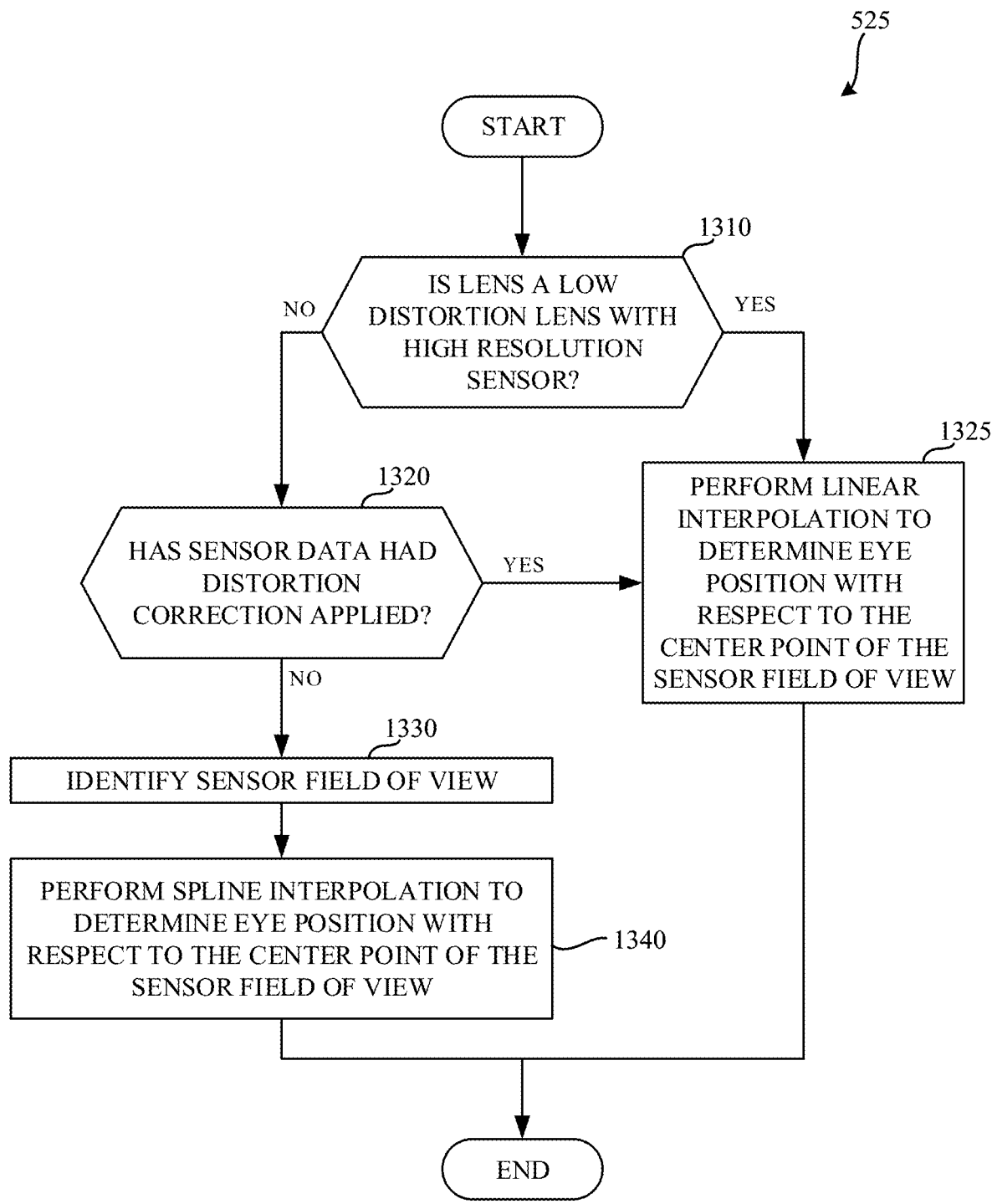
FIG. 13 is a flowchart representative of machine readable instructions which may be executed to implement the example augmented reality controller of FIGS. 3 and/or 4 to normalize an approximate eye position.

FIG. 13 is a flowchart representative of machine readable instructions which may be executed to implement the example augmented reality controller of FIGS. 3 and/or 4 to normalize an approximate eye position. In examples disclosed herein, two different position approximation approaches are used, depending on the type of lens used and/or whether distortion correction has been applied. The example process 525 of the illustrated example of FIG. 13 begins when the example position normalizer 340 determines whether the lens used by the example sensor 140 is a low distortion lens with a high-resolution. (Block 1310). In examples disclosed herein, the example position normalizer 340 make such a determination by inspecting configuration information stored in the example configuration data store 370. If the example sensor uses a low distortion lens with a high-resolution sensor (e.g., block 1310 returns a result of YES), the example position normalizer 340 performs a linear interpolation to determine the eye position with respect to the center point of the sensor field-of-view. (Block 1325). An example diagram 1400 illustrating the linear interpolation is shown in the illustrated example of FIG. 14.

Returning to block 1310, if the lens is not a low distortion lens with a high-resolution sensor (e.g., block 1310 returns a result of NO), the example position normalizer 340 determines whether the sensor data has had distortion correction applied. (Block 1320). In some examples, the sensor itself may have applied distortion correction, and/or such distortion correction may have been applied by the example image pre-processor 310. If distortion correction has been applied (e.g., block 1320 returns a result of YES), the example position normalizer 340 performs a linear interpolation to determine the eye position with respect to the center point of the sensor field-of-view. (Block 1325).

Figure 16:
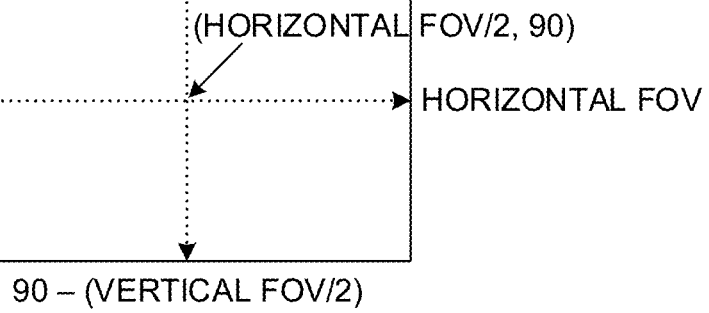

Returning to block 1320, if the sensor data has not had distortion correction applied (e.g., block 1320 returns a result of NO), the example position normalizer 340 identifies a sensor field-of-view. (Block 1330). In some examples, the sensor field-of-view is identified based on a configuration stored in the example configuration data store 370. The example position normalizer 340 then perform spline interpolation to determine an eye position with respect to the center point of the sensor field-of-view. (Block 1340). An example diagram 1500 illustrating the spline interpolation is shown in the illustrated example of FIG. 15. For lenses with accentuated or asymmetric distortion that are not corrected via pre-processing distortion, spline interpolation of certain sensor pixel intervals can be used to minimize error rates in angular estimation. In examples disclosed herein, normalized "radial" angular measurements can be in degrees, radians, or other representations. In examples disclosed herein, degrees are the chosen value representation, with a central pixel point marked as (HORIZONTAL_FOV/2, 90°) increasing in degrees towards row 0 of the image, and decreasing in degrees towards column 0 in the example diagram 1600 of FIG. 16.

Figure 17:
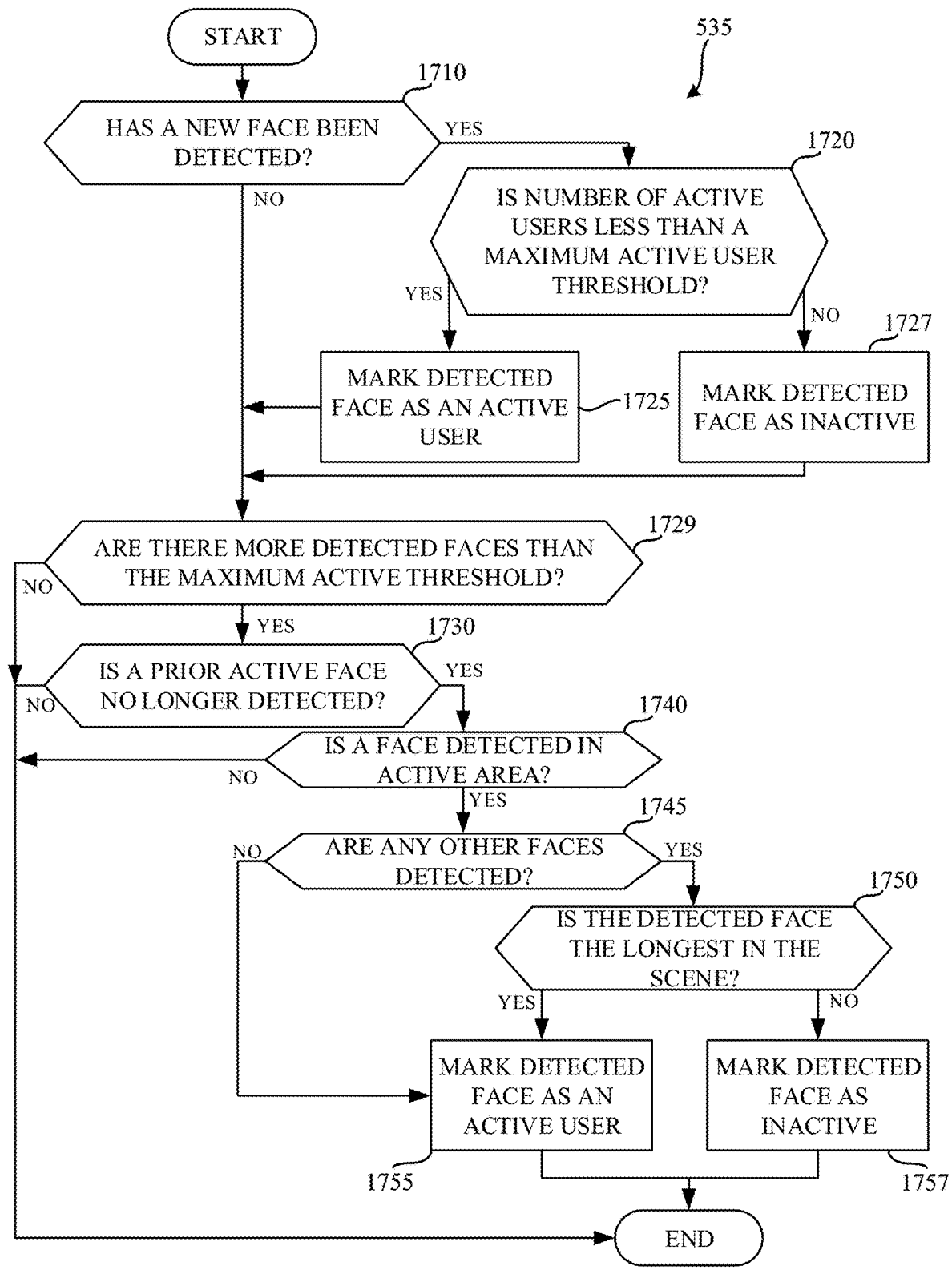
FIG. 17 is a flowchart representative of machine readable instructions which may be executed to implement the example augmented reality controller of FIGS. 3 and/or 4 to track a face of an active user.

FIG. 17 is a flowchart representative of machine readable instructions which may be executed to implement the example augmented reality controller of FIGS. 3 and/or 4 to track a face of an active user. Each labeled estimated eye position is either marked "active" or "inactive." In some examples, there is one "active" tracked user. However, in some examples, there are multiple "active" tracked users.

The example process 535 of the illustrated example of FIG. 17 begins when the example user selector 345 determines whether a new face is been detected. (Block 1710). A new face may be detected when, for example, a user approaches the augmented reality system and begins to use the system. In some examples, another user may have already been using the augmented reality system, and the new user who approaches the augmented reality system (e.g., enters into a field of view of the sensor 140) is considered a second user. When the new face is been detected (e.g., block 1710 returns a result of YES), the example user selector determines whether the number of active users is less than a maximum active user threshold. (Block 1720). In examples disclosed herein, the maximum active user threshold is stored in the system configuration 370. If the number of active users is less than the maximum active user threshold (e.g., block 1720 returns a result of YES), the example user selector 345 marks the detected face as an active user. (Block 1725). If the number of active users is not less than the maximum active user threshold (e.g., block 1720 returns a result of NO), the example user selector 345 marks the detected face as an active user. (Block 1727). In this manner, new users who approach the system can be considered active users if the maximum user threshold has not yet been met.

In some examples, more users may be present than the maximum active user threshold. For example, if the system were to be able to support one active user, and a second user were to approach the system, the example user selector 345 will select an active user among the users in front of the example augmented reality system. The example user selector 345 determines whether there are more detected faces than the maximum active user threshold. (Block 1729). If there are no more detected faces than the maximum active user threshold (e.g., block 1729 returns a result of NO), the example process 535 of the illustrated example of FIG. 17 terminates. That is, if the number of users marked as active users is consistent with (e.g., does not exceed) the maximum number of users supported by the example augmented reality system, there is no need to select among those active users.

However, if there are more detected faces than the maximum active user threshold (e.g., block 1729 returns a result of YES), the example user selector 345 determines whether a prior active face is no longer detected. (Block 1730). That is, if a prior active user has moved away from the display, a new active user may be selected. However, if that prior user has not moved away from the system (e.g., the user continues to use the system), the example process 535 of the illustrated example of FIG. 17 terminates.

If the prior user has moved away from the system (e.g., has left the field of view of the sensor 140) (e.g., block 1730 returns a result of YES), the example user selector 345 determines whether a face is detected in an active area. (Block 1740). In examples disclosed herein, the active area is defined as an area where a viewer is most likely to want to start actively viewing content. In some examples, this area may change due to, for example, a physical orientation of the device, lens field of view, etc. In some examples, this is an area covering no more than half (e.g., fifty percent) of the frame and that is positioned directly in front of the content display. If the example sensor 140 is oriented vertically, the active area may be considered to be the area in the center of the sensor field of view. If the example sensor 140 is oriented horizontally, the active area may be considered to be the area in the lower third of the sensor field of view. If no face is detected in the active area (e.g., block 1740 returns a result of NO), the example process 535 of FIG. 17 terminates.

If a face is detected in the active area (e.g., block 1740 returns a result of YES), the example user selector 345 determines whether any other faces are detected in the active area. (Block 1745). If only a single face is detected in the active area (e.g., block 1745 returns a result of NO), the example user selector 345 marks the detected face as an active user. (Block 1755). Returning to block 1745, if multiple faces are detected in the active area (e.g., block 1745 returns result of YES), the example user selector 345 determines whether the newly detected face is the longest has been present in the scene for the longest amount of time as compared with the other detected faces. (Block 1750). If the detected face has been in the scene for the longest period of time (e.g., block 1750 returns a result of YES), the example user selector 345 marks the detected face as an active user. (Block 1755). If the detected face has not been in the scene for the longest period of time (e.g., another face has been in the scene for a longer period of time) (e.g., block 1750 returns result of NO), the example user selector marks the detected face as an active user. (Block 1757). The example process 535 of the illustrated example of FIG. 17 then terminates.

While the illustrated example of FIG. 17 selects an active user based on which user has been in the scene for the longest, any other approaches to selecting an active user(s) may additionally or alternatively be used. For example, a user can request to be the "active" user. Such a request may be identified using, for example, a fiducial marker, a controller, or other tracked physical object and/or identifier from one user to another. In some examples, a tracked gesture (e.g., hand sign(s)) may be used to signal a transfer of an active user. In some examples, physical movement into a defined viewing area when an active user is outside of such area may be used. In examples disclosed herein, marking a user as active locks further processing to that user, thereby reducing the likelihood that undesirable visual effects while rendering and interacting with content may be presented (e.g., display artifacts).

Figure 18:
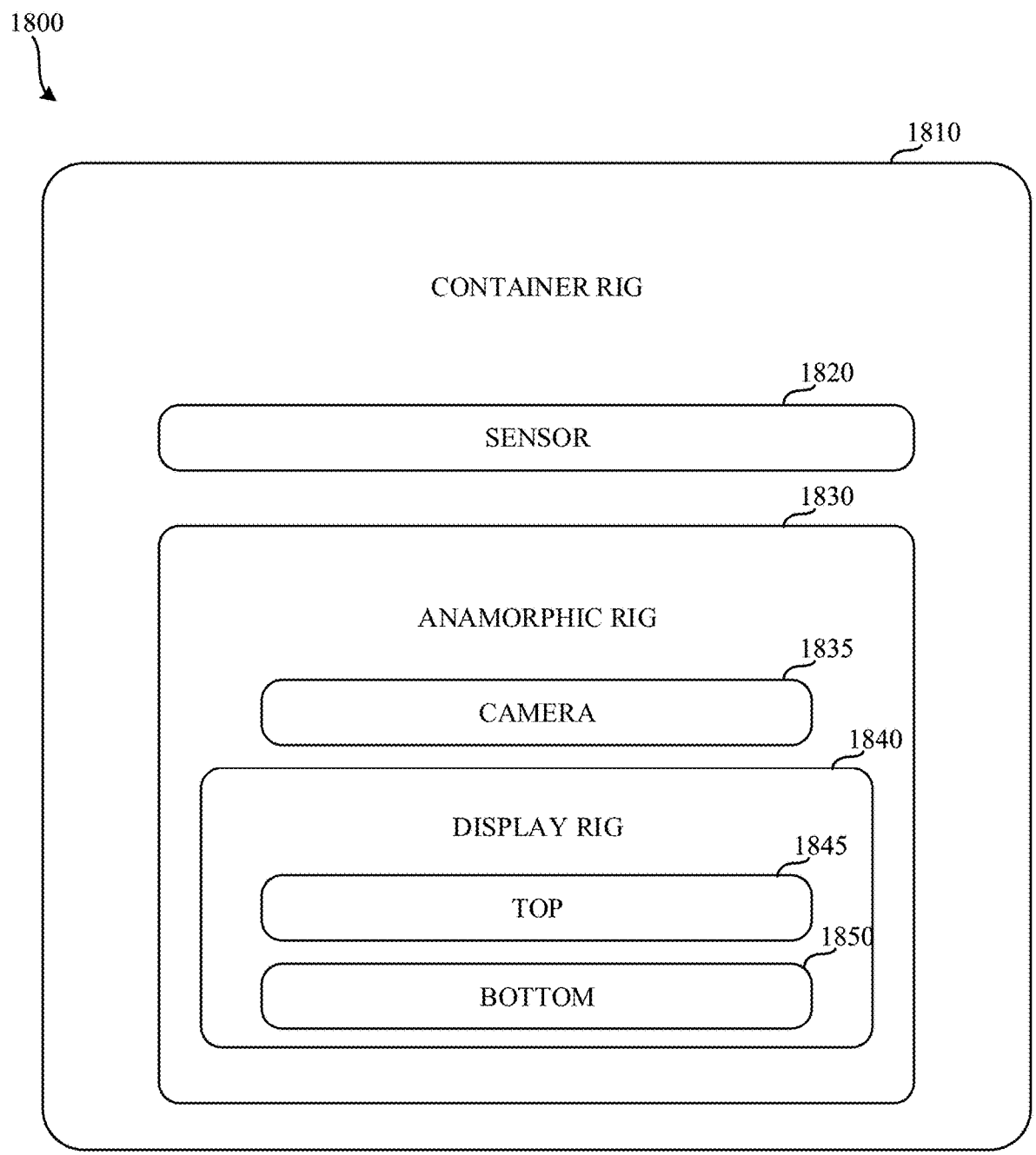
FIG. 18 is a block diagram representing a logical hierarchy of the augmented reality system of FIGS. 1, 2, and/or 3.

FIG. 18 is a block diagram representing a logical hierarchy 1800 of the augmented reality system of FIGS. 1, 2, and/or 3. The highest logical layer of the perspective camera system is a container rig 1810. The container rig provides a portable abstraction across multiple system configurations and interfaces.

Within the container rig 1810, a sensor 1820 and anamorphic rig 1830 are represented. In examples disclosed herein, the configuration of the example sensor 1820 and the anamorphic rig 1830 are stored in the example configuration data store 370 based on the hardware properties and layout. The anamorphic rig 1830 includes a camera 1835 that provides an interface to information on how the scene is currently viewed by an "active" tracked user. In practice, an application can use the anamorphic rig camera 1835 component to replace the rendering scene camera information to generate the active user's view of the scene. The sensor 1820 is the starting point for perspective camera transformations. The sensor 1820 is positioned relative to a local origin of the container rig 1810 and a Display Rig 1840 at initialization.

The display rig 1840 provides the layout and aspect ratio for the clipping (physical screen rendered) scene. A display rig top 1845 and a display rig bottom 1850 are parallel lines defining boundaries (e.g., vertical boundaries) for the space of the rendered scene. In examples disclosed herein, the horizontal bounds (left/right) for the scene are computed from the aspect ratio of the display 395 and the display rig top 1845 and display rig bottom 1850 positions. However, in some examples, the display rig may include left and right line information defining boundaries (e.g., horizontal boundaries) for the space of the rendered scene and the top and bottom information may be calculated based on the left and right line information and the aspect ratio of the display 395. In some examples, a non-rectangular display may be used, and any information corresponding to the shape of the display may be included in the display rig 1840.

In practice, the container rig 1810 and its children can be visually represented in a development environment by querying the configuration positions, and rendering each component at the positions specified. For example, the container rig 1810 can be placed in a scene space based on an initial configuration to allow the application to render the scene correctly in initialization. That is, the scene space measurements of the rig are used to derive a unit scale of camera position vector(s), and/or a relationship of the scene space to the physical configuration. Upon initialization, initial values of the rig components are taken to determine scene scale. In this way, the example augmented reality controller 130 enables placement of representative objects in the scene, and feeds the scaled object values at initialization for subsequent calculations.

Figure 19:
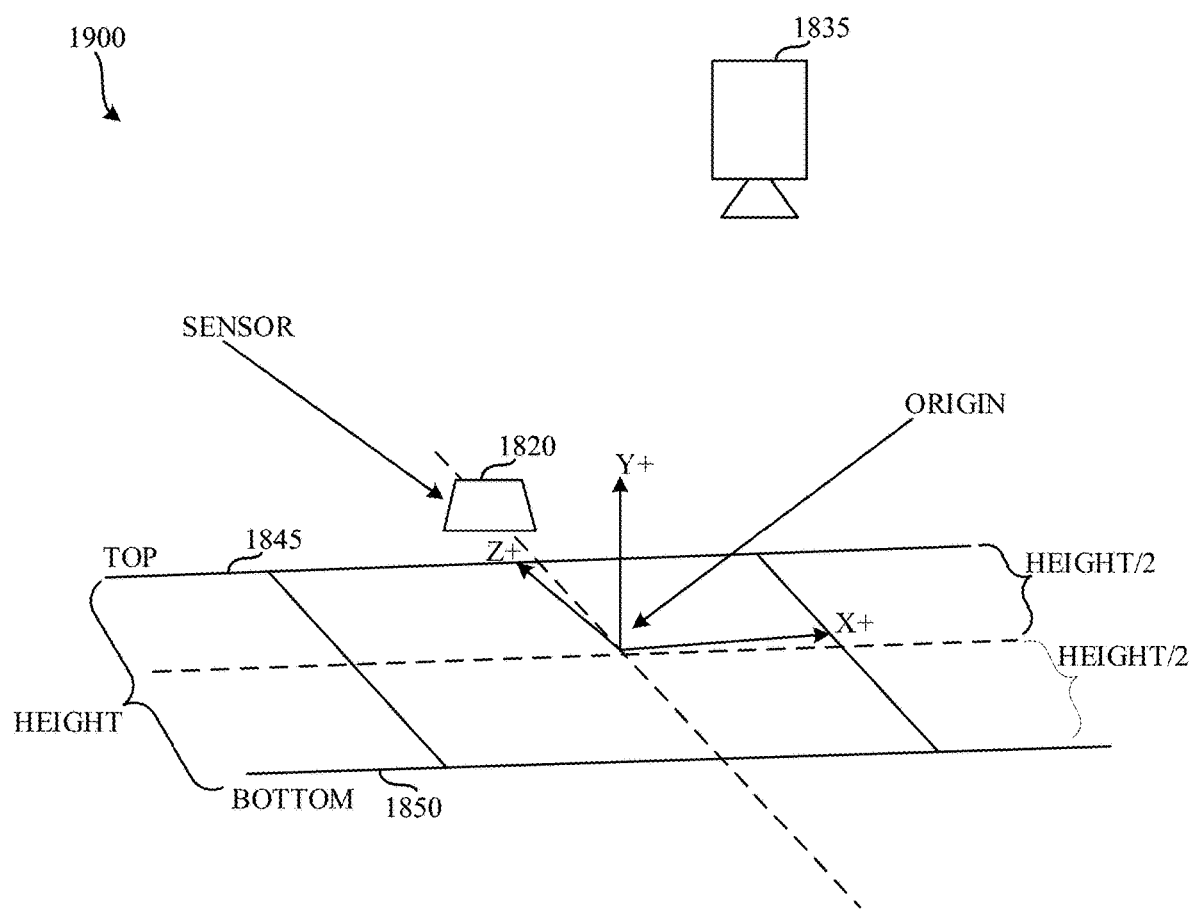
FIG. 19 is a block diagram representing an example physical arrangement of the container rig of FIG. 18.

FIG. 19 is a diagram representing an example physical arrangement 1900 of the container rig 1810 of FIG. 18. Each component's position in the container rig 1810 is referenced in the local space of the container rig 1810. In examples disclosed herein, a left-handed, y-up coordinate system is used, with the origin located at the center of the display screen (between the display rig top 1845 and the display rig bottom 1850). However, any other coordinate system may additionally or alternatively be used.

The anamorphic rig camera 1835 is translated by movement of an estimated eye position of a tracked user, using the information provided by the position normalizer 340 via the example process 525 of FIG. 13. In examples disclosed herein, the translation occurs in the local space of the container rig 1810, and is provided using a three-dimensional vector, shown below in Equation 1.

$$\begin{bmatrix} CameraLocalPosition_x \\ CameraLocalPosition_y \\ CameraLocalPosition_z \end{bmatrix} \qquad \text{Equation 1}$$

Because the container rig 1810 is positioned in the scene space, there is a direct relationship between the local coordinates of the anamorphic rig camera 1835 and the scene space.

Figure 20:
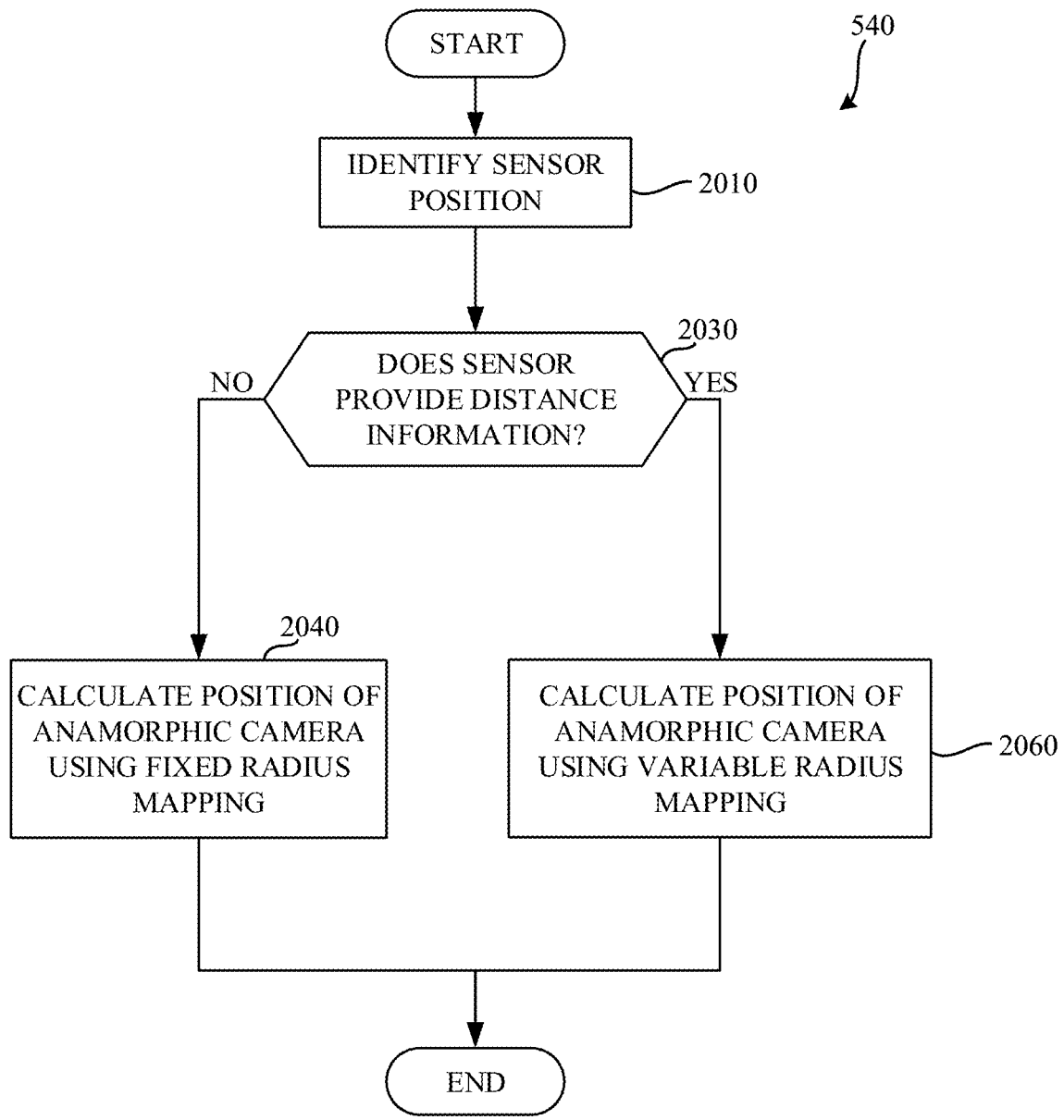
FIG. 20 is a flowchart representative of machine readable instructions which may be executed to implement the example augmented reality controller of FIGS. 3 and/or 4 to calculate a position of an anamorphic camera.

FIG. 20 is a flowchart representative of machine readable instructions which may be executed to implement the example augmented reality controller of FIGS. 3 and/or 4 to calculate a position of an anamorphic camera. The example process 540 of the illustrated example of FIG. 20 begins when the example camera position calculator 350 identifies a position of the sensor. (Block 2010). In examples disclosed herein, the example camera position calculator 350 identifies the position of the sensor by inspecting the example configuration data store 370. However, any other approach to identifying the position of the sensor may additionally or alternatively be used. The example position calculator 350 then determines whether the sensor provides distance information. (Block 2030). In some examples, the sensor, in addition to providing image data, may also provide distance data. To determine whether the example sensor provides distance information, the example camera position calculator 350 inspects the data returned by the sensor to determine whether distance information is included in the data.

Figure 21:
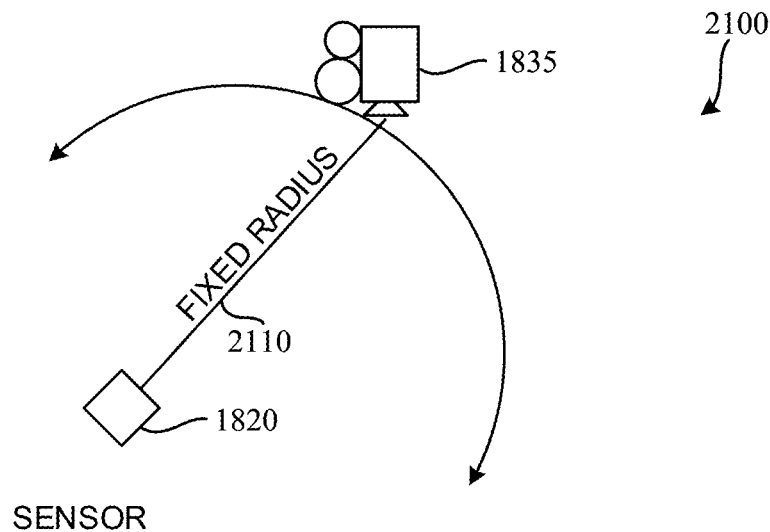
FIG. 21 is a diagram illustrating an example approach to determining a position of the anamorphic camera using a fixed radius from the sensor of the example augmented reality system of FIGS. 1, 2, 3, and/or 4.

If the example sensor does not provide distance data (e.g., block 2030 returns a result of NO), the example camera position calculator 350 calculates a position of the anamorphic camera using a fixed radius mapping. (Block 2040). An example approach to using a fixed radius mapping is shown in the illustrated example of FIG. 21. FIG. 21 is a diagram 2100 illustrating an example approach to determining a position of the anamorphic camera using a fixed radius from the sensor of the example augmented reality system of FIGS. 1, 2, 3, and/or 4. In the illustrated example of FIG. 21, a fixed user viewing distance is assumed based on physical sensor tracking limits. The anamorphic rig camera 1835 is logically positioned to a fixed length (e.g., movement radius) from the sensor 1820 and moves about the sensor 1820 at a fixed radius 2110. In some examples, this approach is referred to as a "camera on a string."

Figure 22:
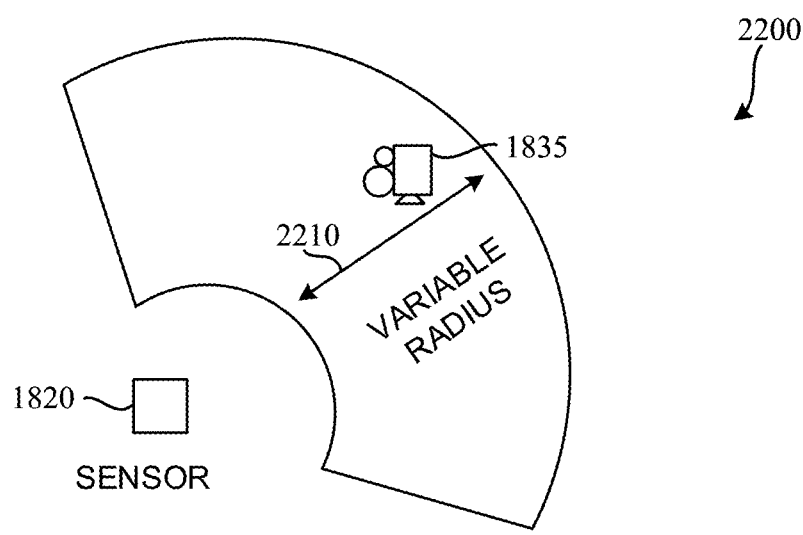
FIG. 22 is a diagram illustrating an example approach to determining a position of the anamorphic camera using a variable radius from the sensor of the example augmented reality system of FIGS. 1, 2, 3 and/or 4.

Returning to FIG. 20, if the example sensor provides distance information (e.g., block 2030 returns a result of YES), the example camera position calculator 350 calculates the position of the camera using a variable radius mapping. (Block 2060). An example approach to using the variable radius mapping is shown in the illustrated example of FIG. 22. FIG. 22 is a diagram 2200 illustrating an example approach to determining a position of the anamorphic camera 1835 using a variable radius 2210 from the sensor 1820. In some examples, the example sensor 1820 also reports a distance of a user. In this example, the camera moves within a 3D space about the sensor 1820. This variable distance allows for more accurate estimation of y and z coordinate values for the rendering of the scene, and can also allow for user-induced scene zoom and/or other interactivity models.

Figure 23:
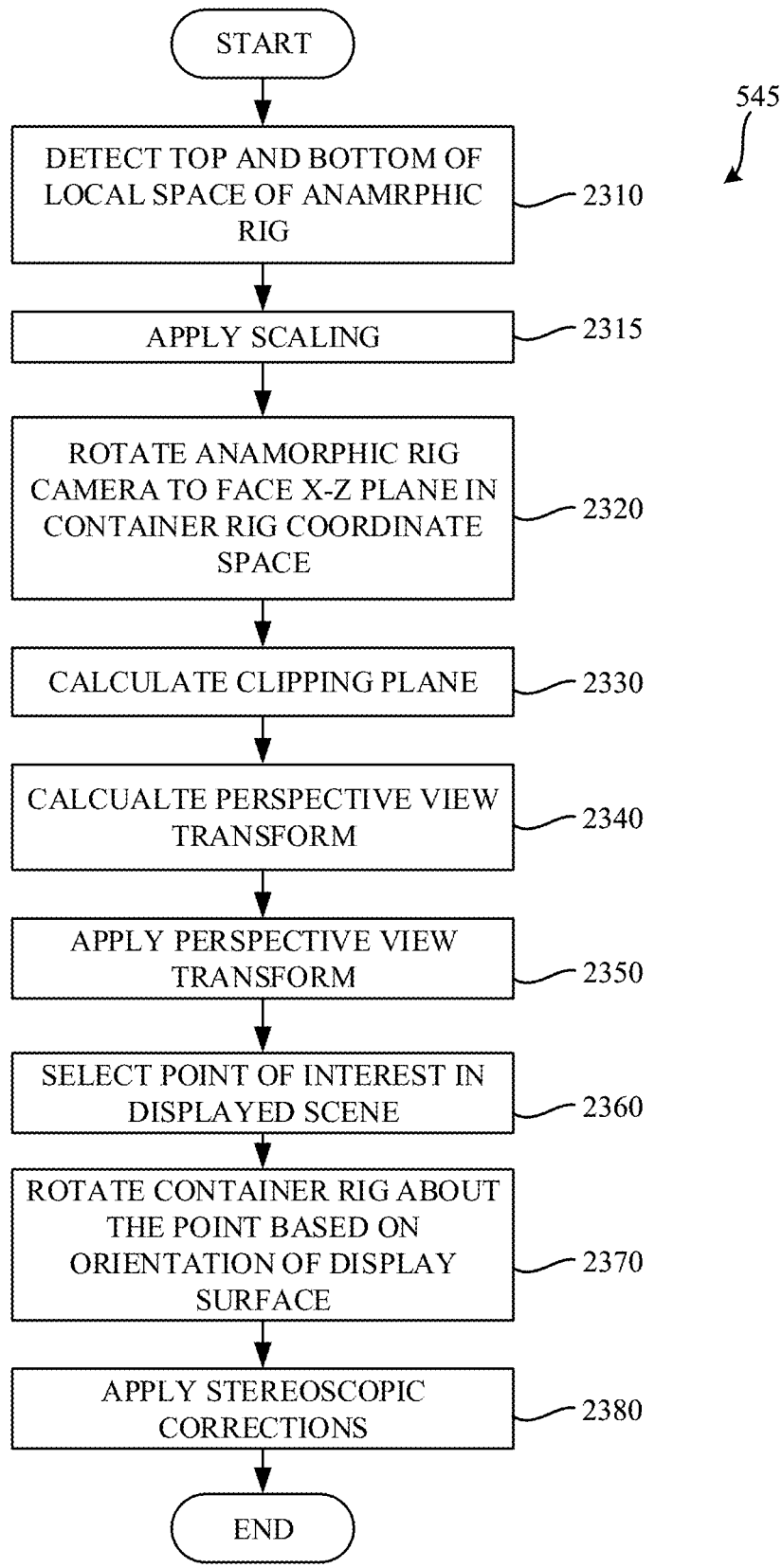
FIG. 23 is a flowchart representative of machine readable instructions which may be executed to implement the example augmented reality controller of FIGS. 3 and/or 4 to apply perspective corrections to an anamorphic camera.
Figure 24A:
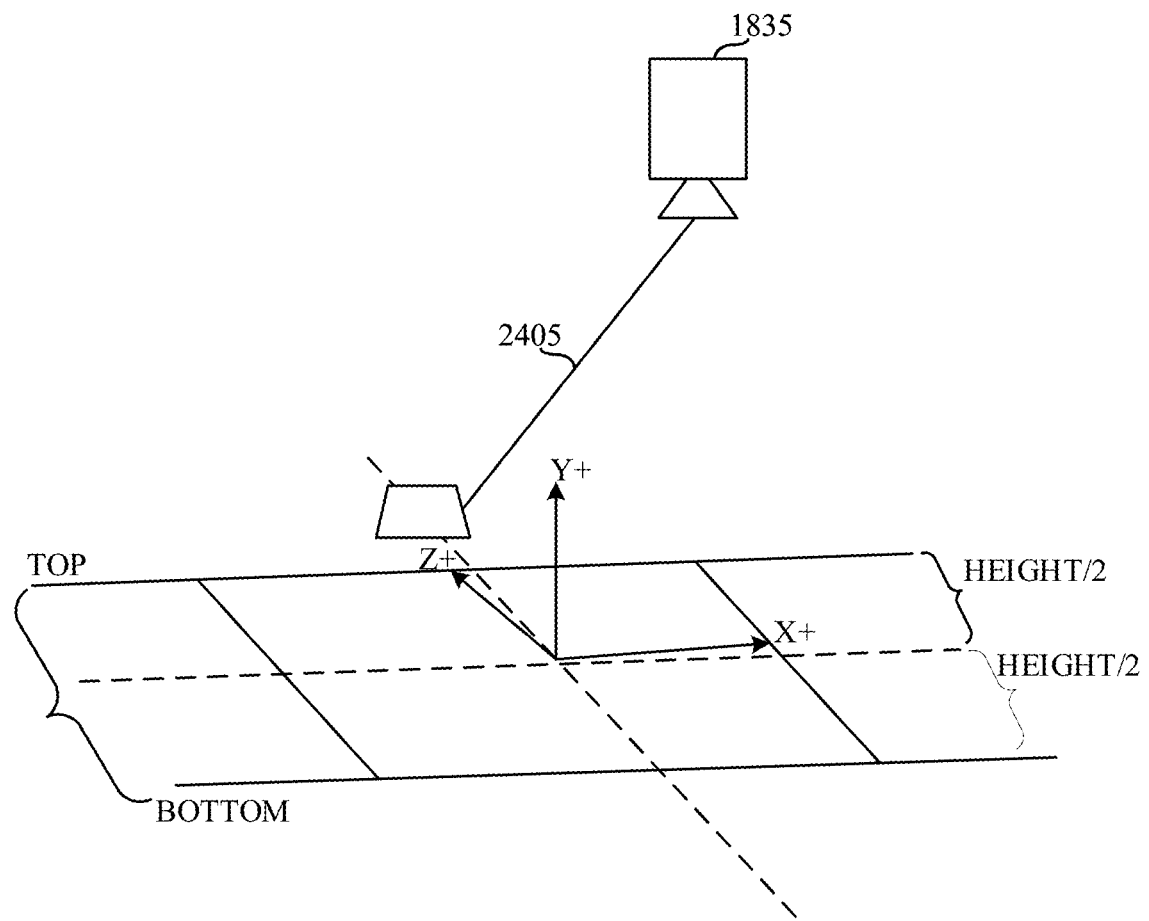
FIG. 24A is a diagram illustrating an example movement radius.
Figure 24B:
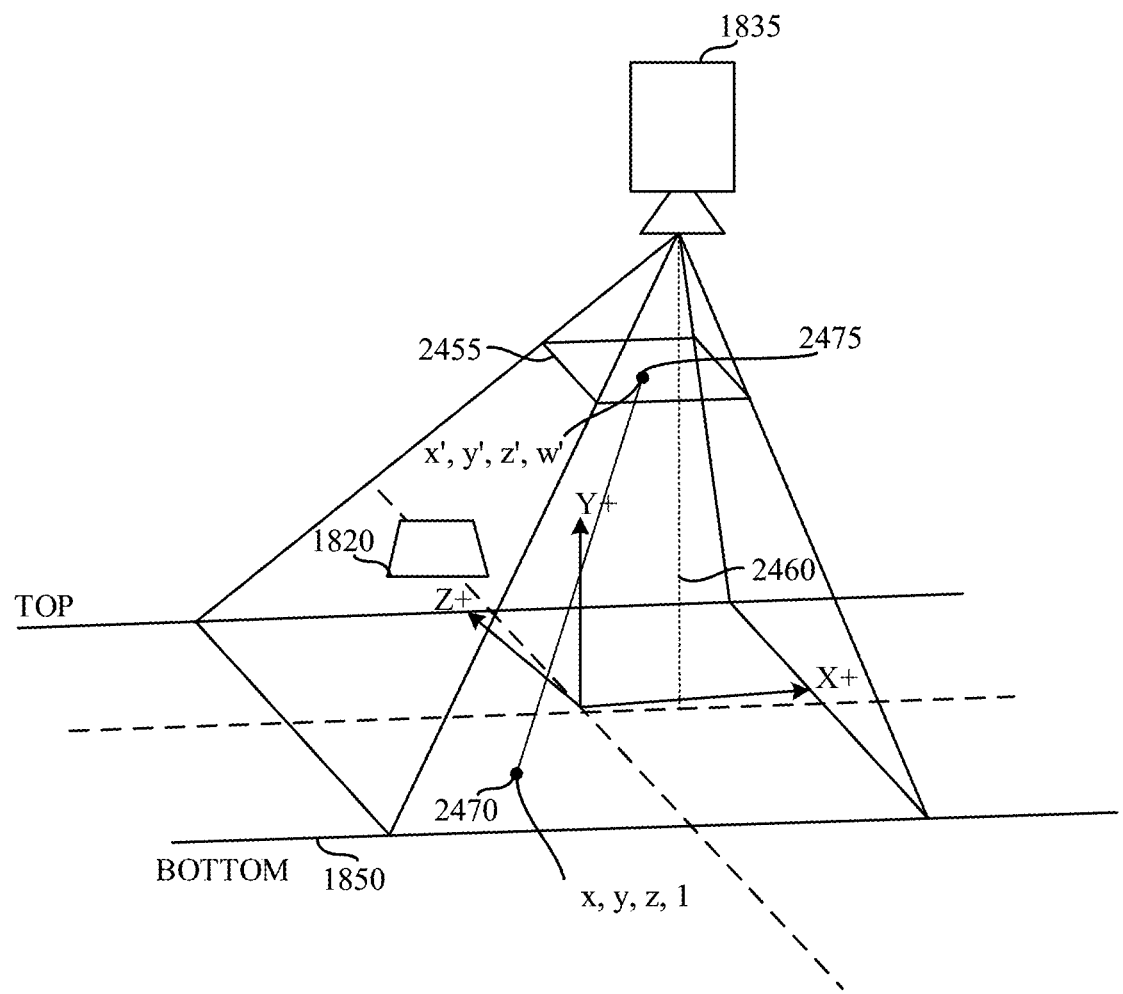
FIG. 24B is a diagram illustrating an example clipping plane.

FIG. 23 is a flowchart representative of machine-readable instructions 545 which may be executed to implement the example augmented reality controller of FIGS. 3 and/or 4 to apply perspective corrections to an anamorphic camera. The example process 545 of the illustrated example begins when the example perspective transform generator 355 detects a display rig top and display rig bottom of the local space of the anamorphic rig. (Block 2310). In examples disclosed herein, the display rig top and the display rig bottom of the local space of the anamorphic rig enable a zoom value to be calculated. To achieve a closer view of the scene, the display rig bottom and display rig top are translated on the scene plane closer to the origin (e.g., the middle point between the two lines). This enables the center of the zoomed scene to remain in the same position (e.g., at the origin). In some examples, to achieve a further view, the display rig bottom and display rig top are translated further from the origin. This is achieved by the perspective transform generator 355 scaling the position component distance from the origin of the two lines. (Block 2315). This can be simplified to a simple scalar of the ratio between the persistent storage read configuration information:

$$TransformScale = \frac{(Top - Bottom)}{DisplayScalar} \times Scale_{new} \qquad \text{Equation 2}$$

In examples disclosed herein, values for the display rig top, the display rig bottom, and a DisplayScalar (which may be derived from a real-world measurement of the physical display), are retrieved from the configuration data store 370. In examples disclosed herein, a Scalenew value is an application derived floating point value greater than 0.0 (e.g., 2). However, any other value and/or approach to representing a value may additionally or alternatively be used.

Application of this movement will change the scale between physical and in-game distances and resulting in the anamorphic rig camera and sensor positions being updated to reflect the new scale. The resulting anamorphic rig camera output will then reflect the updated configuration, using Equation 3, below.

$$Camera_{New} = (Camera_{Norm} \times MovementRadius + Sensor_{Norm}) \times TransformScale \qquad \text{Equation 3}$$

In example Equation 3, the movement radius is the movement radius calculated in connection with FIGS. 20, 21, and/or 22. An example of the movement radius is shown in the illustrated example of FIG. 24A, where the movement radius 2405 is used in connection with the calculation of the position of the anamorphic camera 1835.

Returning to FIG. 23, the example perspective transform generator 355 rotates the anamorphic rig camera to face the x-z plane in the container rig local coordinate space. (Block 2320). As a result, a near clipping plane is then parallel to the surface plane to avoid distorting the scene. In the illustrated example of FIG. 24B, the camera 1835 is positioned facing the display plane.

The example perspective transform generator 355 calculates a near clipping plane for the anamorphic rig camera, with each bound shifted to align with the display rig. (Block 2330). An example clipping plane 2455 is shown in the illustrated example of FIG. 24B. In examples disclosed herein, a top of the clipping plane is calculated as the display rig top scaled to the ratio of the current near plane's z-distance (length) and the camera's distance to the display rig plane (e.g., along the camera centerline 2460). A bottom of the clipping plane is calculated as the display rig bottom scaled to the ratio of current near plane's z-distance (length) and the camera's distance to the display rig plane (e.g., along the camera centerline 2460). A right edge of the clipping plane is calculated from the aspect ratio of the display, using the display rig top and/or display rig bottom lengths, and is scaled to the ratio of current near plane's x-width and the camera's distance to the display rig plane (e.g., along the camera centerline 2460). A left edge of the clipping plane is calculated from the aspect ratio of the display, using the display rig top and/or display rig bottom lengths, and is scaled to the ratio of current near plane's x-width and the camera's distance to the display rig plane (e.g., along the camera centerline 2460).

Returning to FIG. 23, the example perspective transform generator 355 calculates a perspective view transform. (Block 2340). In examples disclosed herein, the perspective view transform is an off-center matrix, mapped to the evaluated values of the display rig top and the display rig bottom in the local space of the anamorphic rig. In examples disclosed herein, the perspective view transform (e.g., anamorphosis distortion) is calculated using a 4×4 matrix for right-hand coordinate system cameras. Such an approach transforms a left-hand coordinate system of the container rig to the right-hand coordinate system of the near clipping plane of the anamorphic rig camera. An example transform matrix is shown in Equation 4, below.

$$\begin{bmatrix} l & 0 & a & 0 \\ 0 & h & b & 0 \\ 0 & 0 & c & d \\ 0 & 0 & e & 0 \end{bmatrix} \times \begin{bmatrix} x \\ y \\ z \\ w=1 \end{bmatrix} = \begin{bmatrix} x' \\ y' \\ z' \\ w'=-z \end{bmatrix} \qquad \text{Equation 4}$$

In Equation 4, x, y, z, and w represent coordinates for a point on the display plane (e.g., point 2470 of FIG. 24B), and x', y', z', and w' represent coordinates for a point on the clipping plane (e.g., point 2475 of FIG. 24B). 1 represents a normalized ratio of the near clipping plane of the camera to the distance between the left edge of the clipping plane and the right edge of the clipping plane (e.g., the extant width of the display rig, representing the real world display). h represents a normalized ratio of the near clipping plane of the camera to the distance between the top of the clipping plane and the bottom of the clipping plane (e.g., the extant height of the display rig container, representing the real world display). a represents a normalized shift to left or right of the camera center line, the z-component effect on x'. b represents a normalized shift to the top or bottom of the camera center line, the z-component effect on y'. c represents a first coefficient for the normalized shift towards or away from the camera for z'. d represents a second coefficient for the normalized shift towards or away from the camera for z'. e represents a constant (e.g., −1), normalized distance of the viewer from the display surface for the projection space (for a right-hand camera).

Once the perspective view transform is generated, the example perspective transform generator 355 applies the perspective view transform to the application scene camera (which has been translated) to provide the corrected perspective render for a tracked user. (Block 2350).

To allow for correct perspective rendering when rotating a system on an axis, such as from a horizontal orientation (e.g., projection on a table) to a vertical orientation (e.g., projection on a wall), the container rig can be rotated about a point within the scene so that the rendering can be done with the surface at any angle. In doing so, the content is able to be rendered without complex changes to the Container Rig system. The example perspective transform generator 355 selects a point of interest in the displayed scene. (Block 2360). In some examples, the point is selected by interacting with the user application 390 to select a point of interest. In some examples, the origin and/or another fixed point is selected.

The example perspective transform generator 355 then rotates the container rig about the point based on the orientation of the display surface. (Block 2370). As a result, the perception of viewing content is different between vertical or horizontal orientations since the user is not looking down at the content, but instead looking at content in front of them. The physical rotation of the system presents a new viewing orientation, while the perspective view transformation corrects the content to the user viewpoint. While in examples disclosed herein, a horizontal orientation and a vertical orientation are described, any other orientation (e.g., an angled orientation) may additionally or alternatively be used.

Figure 25A:
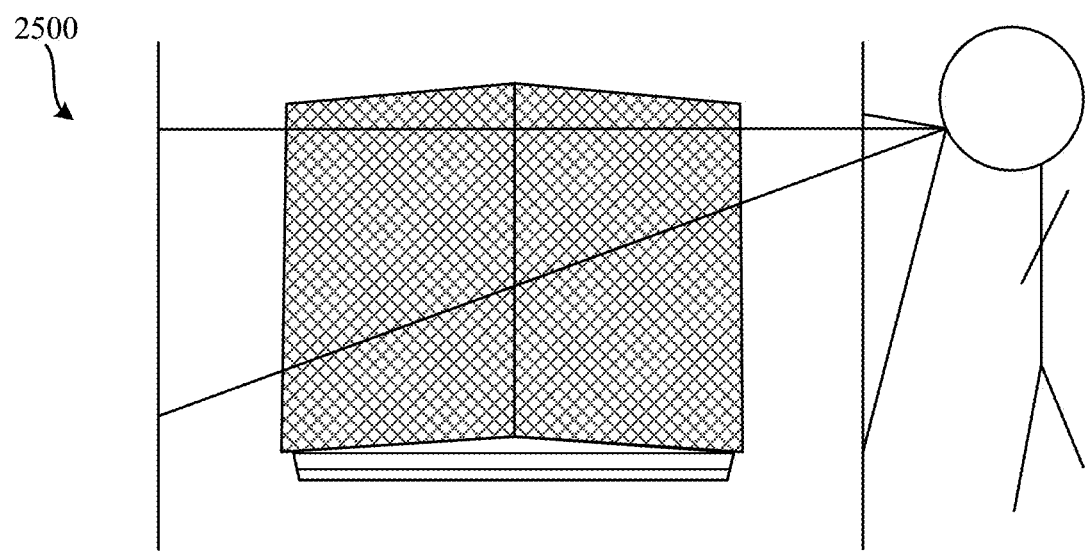
FIG. 25A is a diagram of an example perspective of an image displayed on a horizontal display surface (e.g., a tabletop).

For example, a scene containing a house on a horizontal surface would require that the scene be rendered such that the user would be viewing the roof of the house. FIG. 25A is a diagram of an example perspective 2500 of an image displayed on a horizontal display surface (e.g., a tabletop). In the illustrated example of FIG. 25A, a user standing next to the display surface (e.g., the tabletop), will have a vantage point where the user is looking down towards the display surface. To make the display realistic, a similar vantage point is applied within the 3D space, so that the user is looking down towards the displayed model (e.g., a house).

Figure 25B:
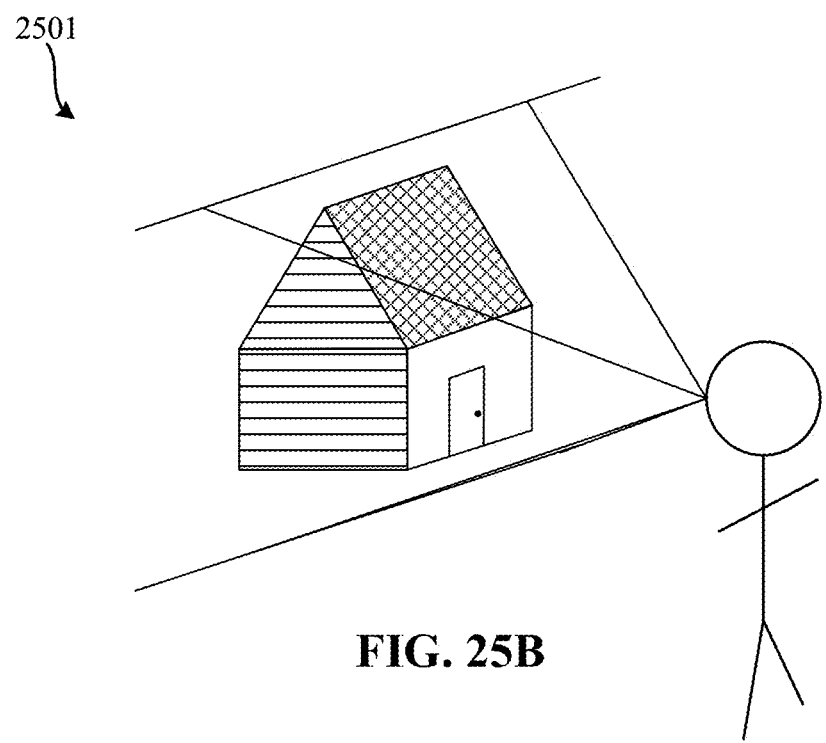
FIG. 25B is a diagram of an example perspective of an image displayed on a vertical display surface (e.g., a wall).

In contrast, the vertical scene would require that the scene be rendered such that the user would be viewing the front or side of the house. FIG. 25B is a diagram of an example perspective 2501 of an image displayed on a vertical display surface (e.g., a wall). In the illustrated example of FIG. 25B, a user standing next to the display surface (e.g., the wall), will have a vantage point where the user is looking straight-ahead at the display surface. To make the display realistic, a similar vantage point is applied within the 3D space, so that the user is straight-ahead at the displayed model (e.g., a house).

As a result, the same scene can be properly rendered for both projections by rotating the container rig about the rotation point within the scene. The scene rotation rendering correlates to expected physical perceptions of the scene, from each viewpoint.

Figure 26:
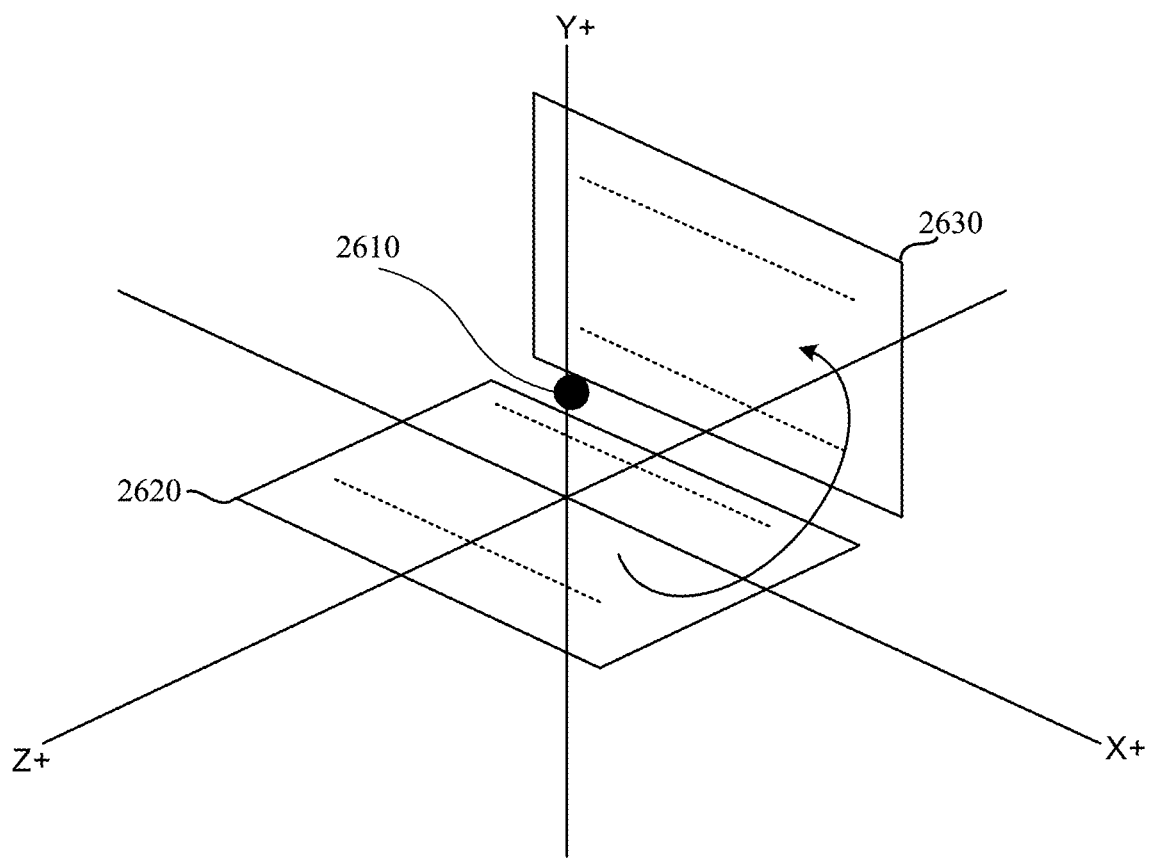
FIG. 26 is a diagram of an example transition between a horizontal display surface and a vertical display surface about a rotation point.

FIG. 26 is a diagram of an example transition between a horizontal display surface and a vertical display surface about a rotation point 2610. In examples disclosed herein, the container rig is rotated so that the display rig top and display rig bottom are no longer on a Y-plane 2620, but instead, are rotated to be on a Z-plane 2630. This rotation is done about the rotation point 2610 in order to preserve the center of the scene and ensure that the contents of the scene displayed to the user do not drastically change. In examples disclosed herein, the rotation point 2610 allows rotation along each of the three axes. The rotation point is positioned within the scene along with the container rig such that the content is visible along the entirety of the rotational range along each axis, and is placed within the scene to allow the content to be visible in each orientation.

Figure 27:
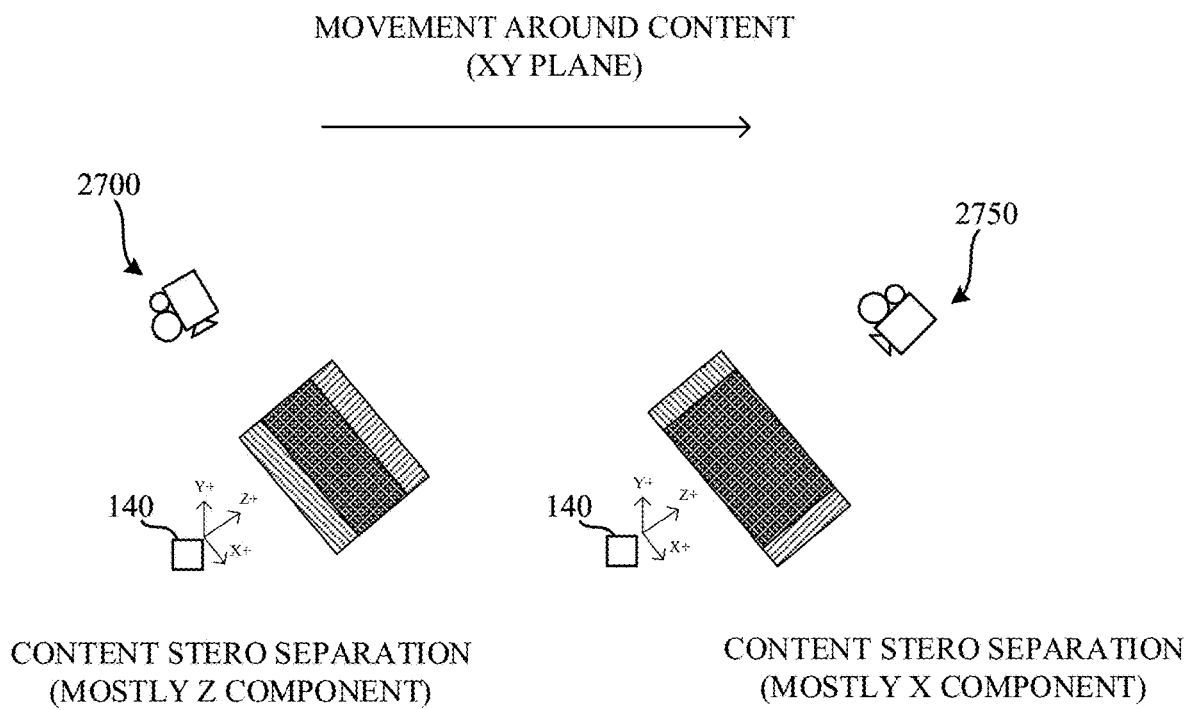
FIG. 27 is a diagram illustrating horizontal content stereo separation as a user moves about a horizontal display surface.

Returning to FIG. 23, the example perspective transform generator 355 applies a stereoscopic correction. (Block 2380). When viewing content on a horizontal surface, such as a raised surface (e.g., table top), a user has a freedom of movement to look at content from angles and orientations that do not fit traditional viewing models using vertical surfaces. That is, the presentation of content using the example approaches disclosed herein is different from other viewing systems, such as head mounted displays (HMDs), mobile devices, and/or cave automatic virtual environments (CAVEs), as movement in a radius around an object does not explicitly rotate the camera view of the object, nor is such movement part of a background scene in an immersive environment. In examples disclosed herein, the stereo images are presented in a way such that they align correctly to the viewing angle of the user as the user moves in the physical space. The change in eye position and angle when moving around a horizontal projection is different than that of a vertical projection. This is seen in FIGS. 27 and/or 28, as the stereo separation moves in both the X-axis and Z-axis when moving about a horizontal projection (e.g., content projected on a table top), while stereo separation is limited to the X-axis when moving about a vertical projection (e.g., content projected on a wall). This is due to eye alignment being x-axis aligned in the vertical configuration, and X and Z aligned in the horizontal configuration.

FIG. 27 is a diagram illustrating horizontal content stereo separation as a user moves about a horizontal display surface. The example diagram of FIG. 27 illustrates a user moving about a horizontal display surface from a first vantage point 2700 to a second vantage point 2750. When the user is positioned at the first vantage point 2700, the stereo separation of the content (e.g., for stereoscopic display) is mostly in the Z component. However, then the user moves to the second vantage point 2750, that separation is mostly in the X component.

Figure 28:
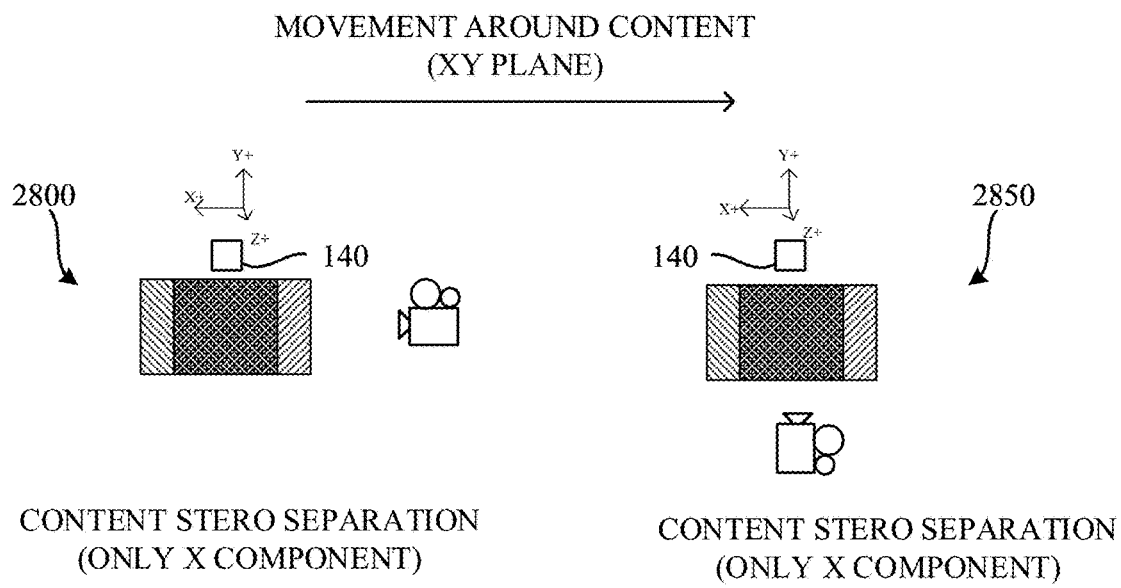
FIG. 28 is a diagram illustrating vertical content stereo separation as a user moves about a vertical display surface.

FIG. 28 is a diagram illustrating vertical content stereo separation as a user moves about a vertical display surface. In contrast to the illustrated example of FIG. 27, when a user moves about a vertical display from a third vantage point 2800 to a fourth vantage point 2850, the stereo separation remains in the X component.

In many graphical engines, the camera object that renders the scene can also render scenes for a 3D display by computing a stereo view. The assumption with these views are such that the direction of the user's view (i.e. the camera's "forward" direction) does not change when viewing the screen, or that if it does, the camera is rotated in the scene accordingly. However, using the anamorphosis perspective projection in this scenario necessitates the positioning of the camera near plane to be parallel to the projection plane (both actually rectangles in each plane), and corresponding edges parallel. Computing a rotational skew component for this projection is expensive and unnecessary.

Figure 29:
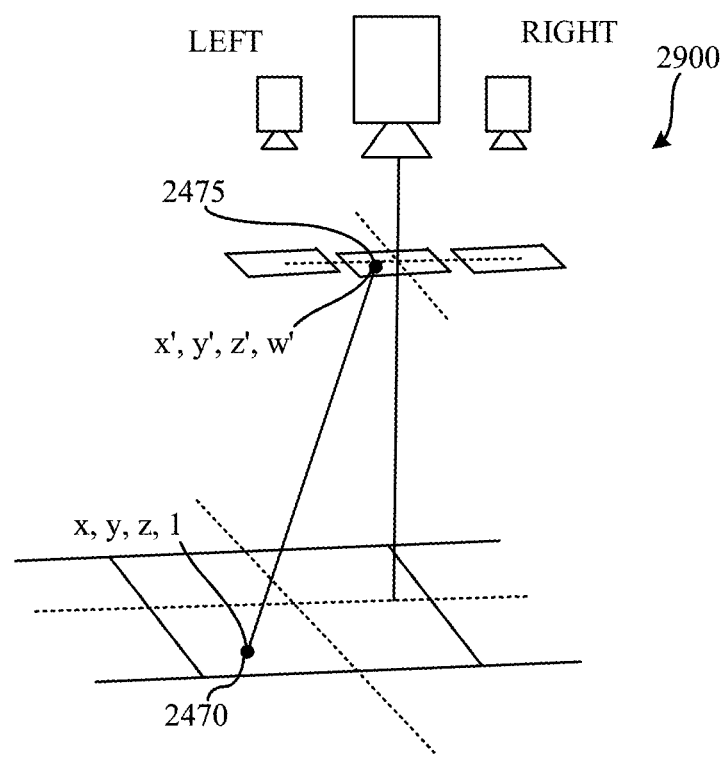
FIG. 29 is a diagram illustrating a camera rotation effect on projection and stereo cameras.
Figure 29:
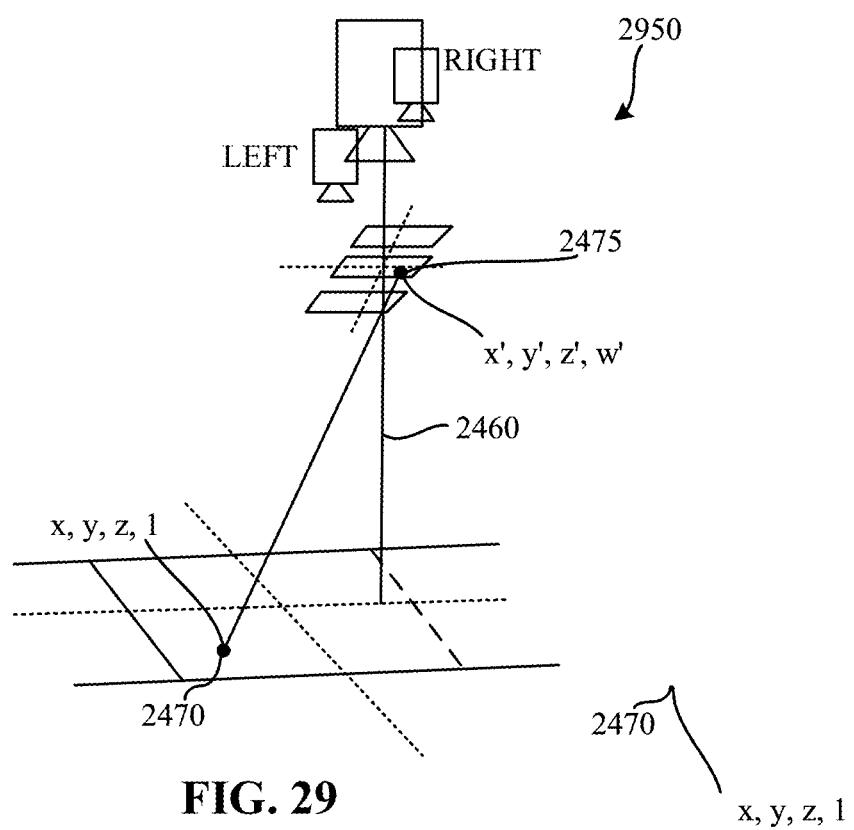

FIG. 29 is a diagram illustrating a camera rotation effect on projection and stereo cameras. FIG. 29 includes a first diagram 2900 prior to rotation of the stereoscopic view, and a second diagram 2950 after rotation of the stereoscopic view. In the illustrated example of FIG. 29, the rotation is performed about the camera centerline 2460. However, rotation may additionally or alternatively be performed about any other object.

In examples disclosed herein, correctly positioning the stereoscopic views includes an additional transformation matrix and the direct computation of the scaled stereo cameras positions. In example approaches disclosed herein, a right-handed coordinate space (Y-up) is used. However, any other coordinate system may additionally or alternatively be used.

In examples disclosed herein, a Translation, Rotation, and Scale matrix (TRS) is calculated from a position of the user in the container rig space. The TRS matrix M (shown below in Equation 5), is an expanded form of the head position vector h in the container rig space, with an identity rotation and scale. Note that the example matrix of Equation 5 is presented using a column major format. However, any other matrix format may additionally or alternatively be used.

$$M = \begin{bmatrix} 1 & 0 & 0 & h_x \\ 0 & 1 & 0 & h_y \\ 0 & 0 & 1 & h_z \\ 0 & 0 & 0 & 1 \end{bmatrix} \quad \text{Equation 5}$$

The example perspective transform generator 355 computes vectors representing the left eye position and the right eye position ($e_{left}$ and $e_{right}$) using a scaled game factor in the physical space (e.g., the display scalar) and an approximated mean for eye position offset in real-world coordinates, using Equation 6, below.

$$\text{offset} = \frac{EyePosition}{DisplayScalar} \quad \text{Equation 6}$$

In some examples, a detected eye position(s) may be used as the eye vectors, with a y-axis skew when detecting a tilted head orientation. The offsets are then applied to compute the eye position vectors, using Equation 7, below.

$$e_{left} = \begin{bmatrix} -offset_{left} \\ 0 \\ 0 \\ 0 \end{bmatrix} \quad \text{Equation 7}$$

$$e_{right} = \begin{bmatrix} offset_{right} \\ 0 \\ 0 \\ 0 \end{bmatrix}$$

In examples disclosed herein, to obtain a correct eye orientation with the appropriate offsets, a "look" rotation is applied to the eye position vectors. In examples disclosed herein, the rotation is accomplished using a quaternion function and its expanded rotation matrix. However, any other approach to applying a rotation may additionally or alternatively be used such as, for example, by using a more traditional look transform described by matrix L, described below in Equation 8. This provides the capability to rotate each eye about the camera, as the camera moves around a display projected on a horizontal surface.

$$L = \begin{bmatrix} xAxis_x & yAxis_x & zAt_x & 0 \\ xAxis_y & yAxis_y & zAt_y & 0 \\ xAxis_z & yAxis_z & zAt_z & 0 \\ camera_x & camera_y & camera_z & 1 \end{bmatrix} \quad \text{Equation 8}$$

In the illustrated example of Equation 8, zAt represents a normalized difference of the monoscopic camera position and the center-point of the content display (display rig), the new Z axis (e.g., forward vector). It is noted that this vector should match the coordinate system, which may, in some examples, necessitate a negative axis vector (e.g., a scale by −1). xAxis represents a normalized cross product of zAt (e.g., the new Z axis) and the "up" vector (e.g., the Y axis) of the container rig. yAxis represents a normalized cross product of xAxis (e.g., the new X axis) and zAt (e.g., the new Z axis). camera represents a monoscopic camera position.

The desired transformation of each eye for the stereo camera position to accurately reflect user head position is then applied, using Equation 9, below.

$$camera_{left} = M \cdot L \cdot e_{left}$$

$$camera_{right} = M \cdot L \cdot e_{right} \quad \text{Equation 9}$$

Although the resulting position(s) is a 4×1 vector, the first 3 rows are used only to position the camera.

The new camera position can be provided to the game engine for further processing. Well-known methods for generating a view matrix from a camera position can also be used to provide the exact camera view transformation matrix to the game engine. To correctly render to each eye's perceived perspective, a perspective matrix is calculated using each camera (eye's) position. The resultant projection matrix follows the same form as described in the perspective view section.

Figure 30:
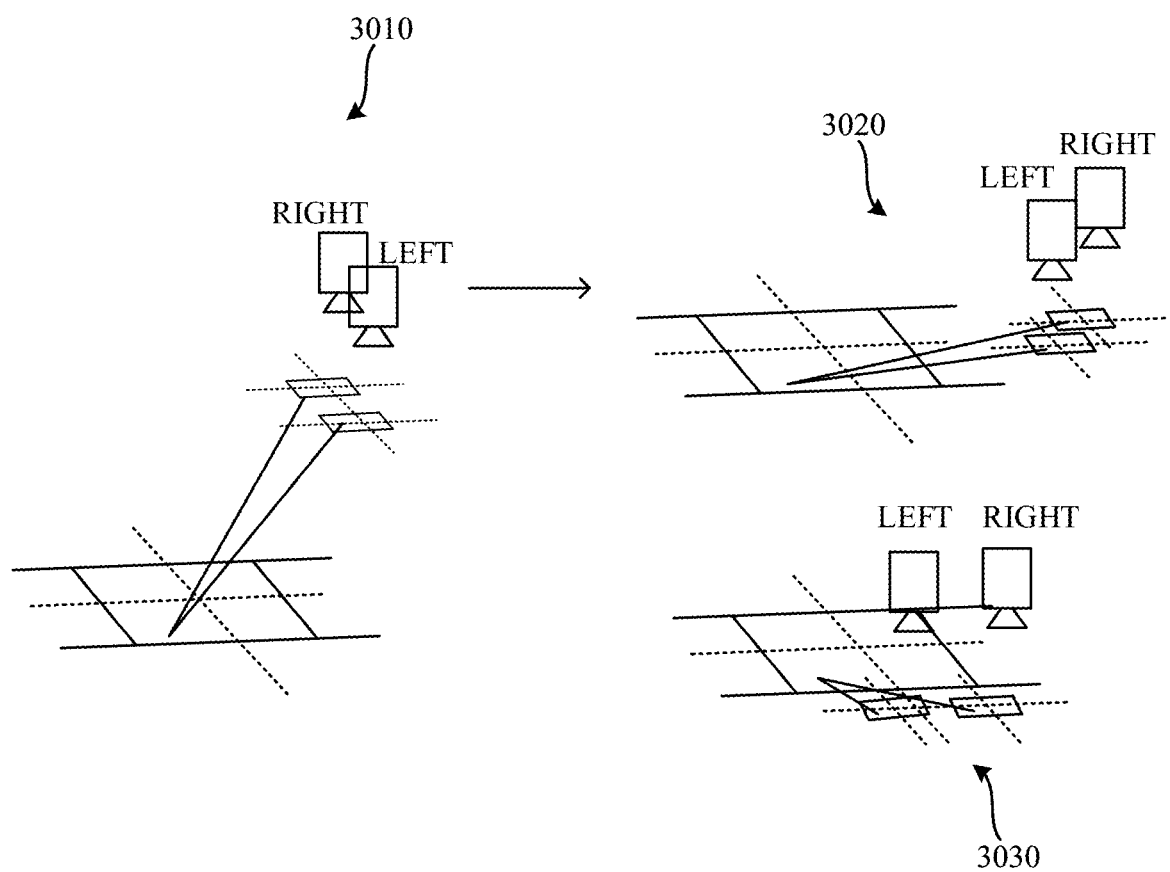
FIG. 30 is a diagram illustrating a corrected stereo camera positioning.

FIG. 30 is a diagram illustrating a corrected stereo camera positioning. A first illustration 3010 shows a vantage point of a user if such rotation corrections were not applied. A second illustration 3020 shows a corrected vantage point of the user. A third illustration 3030 shows an alternative corrected vantage point of the user having a position different than the corrected vantage point of the second illustration 3020.

In example approaches disclosed herein, such calculations enable correction for an orientation of a viewer and also allows the presentation of stereoscopic 3D content at any angle of view around a horizontal projection surface. Such an approach is also robust for horizontal configurations, vertical configurations, and/or other rotations in-between. That is, the stereo image is correctly presented to the user as long as rotation of the container rig is applied.

Figure 31:
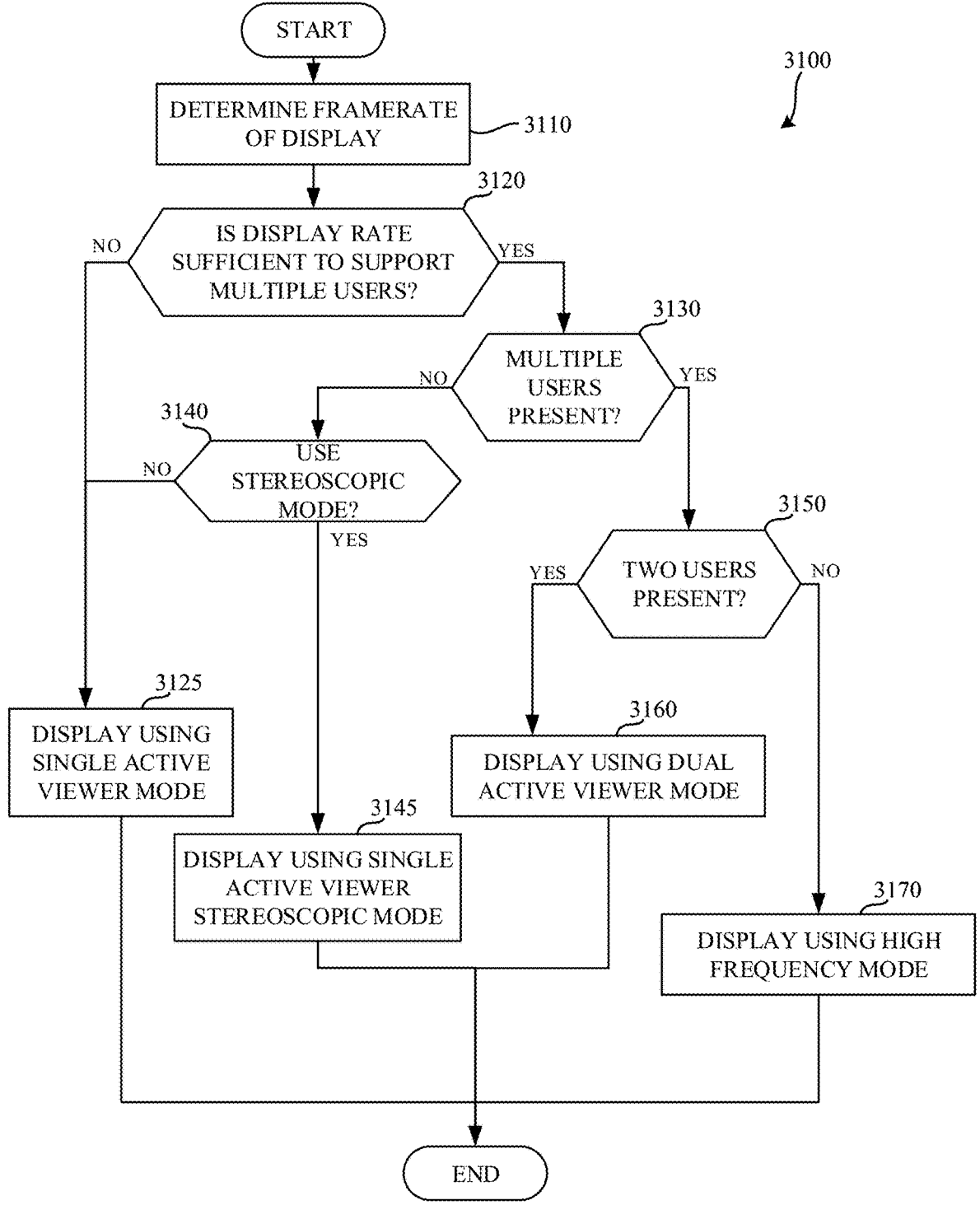
FIG. 31 is a flowchart representative of machine readable instructions which may be executed to implement the example augmented reality controller of FIGS. 3 and/or 4 to enable different display modes based on a number of users present and/or whether stereoscopic glasses are to be used.

FIG. 31 is a flowchart representative of machine readable instructions which may be executed to implement the example augmented reality controller of FIGS. 3 and/or 4 to enable different display modes based on a number of users present and/or whether stereoscopic glasses are to be used. The example process 3100 of the illustrated example of FIG. 31 begins when the example display controller 487 determines a frame rate of the display 395. (Block 3110). In examples disclosed herein, the example display controller 487 directly interacts with the display 395. However, in some examples, the example display controller 487 may interact with the display 395 via, for example, a display driver, an operating system, etc.

The example display controller 487 determines whether the display frame rate is sufficient to support multiple users. (Block 3120). In examples disclosed herein, the display frame rate is considered sufficient to support multiple users when the display frame rate is greater than or equal to a threshold framerate. In some examples, the threshold framerate is 120 Hz. However, any other threshold framerate may additionally or alternatively be used. If the display frame rate is not sufficient for supporting multiple users (e.g., block 3120 returns a result of NO), the example display controller 487 causes the display of content using a single active viewer mode. (Block 3125). In this mode, a single image is displayed based on the vantage point of a single user. Moreover, stereoscopy is not applied to the presented image. An example representation of the single active viewer mode is shown in connection with FIG. 32.

Figure 32:
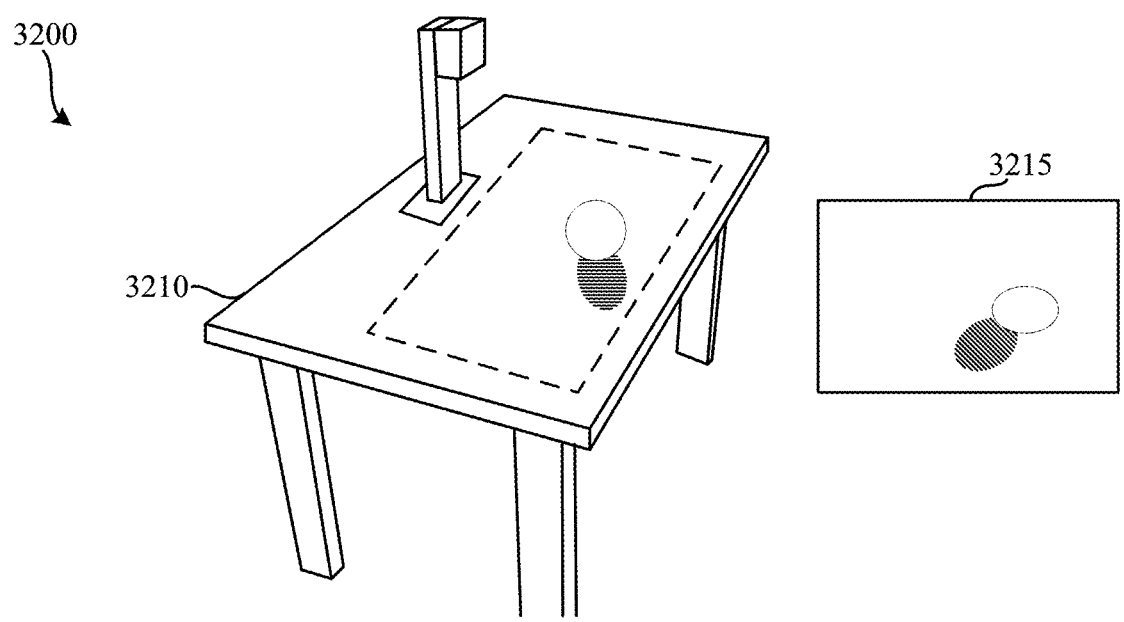
FIG. 32 is an example environment of use including a horizontal display surface viewed by a single user.

FIG. 32 is an example environment of use 3200 including a horizontal display surface 3210 viewed by a single user. In examples where a display with a refresh rate below 120 Hz is used (e.g., the threshold framerate is not met), a single user will typically be the maximum number of active users allowed at a given time. In some examples, a content perspective is rendered for that viewer without stereoscopy applied. Each additional "inactive" viewer simply sees the same frame buffer 3215, albeit distorted to the "active" user's perspective.

Returning to block 3120 of FIG. 31, if the display rate is sufficient to support multiple users (e.g., block 3120 returns a result of YES), the example 3D glasses detector 480 determines whether multiple users are present. (Block 3130). In examples disclosed herein, the example 3D glassed detector 480 determines whether multiple users are detected by interacting with nearby 3D glasses (e.g., the 3D glasses 485) to determine how many pairs of 3D glasses are being worn by users. However, any other approach to determining whether multiple users are present may additionally or alternatively be used such as, for example, analysis of image data from the sensor 140 to determine whether multiple faces are detected.

If multiple users are not detected (e.g., block 3130 returns a result of NO), the example display controller 487 determines whether to use a stereoscopic mode. (Block 3140). In examples disclosed herein, the display controller 487 determines whether to use a stereoscopic mode based on whether a user is wearing 3D glasses (e.g., based on an indication of the same from the 3D glasses detector 480). In some examples, additional considerations may be taken such as, for example, whether the user labeled as the active user is wearing the 3D glasses. If the stereoscopic mode is not to be used (e.g., block 3140 returns a result of NO), the example display controller 487 causes the display of content using a single active viewer mode. (Block 3125).

Figure 33:
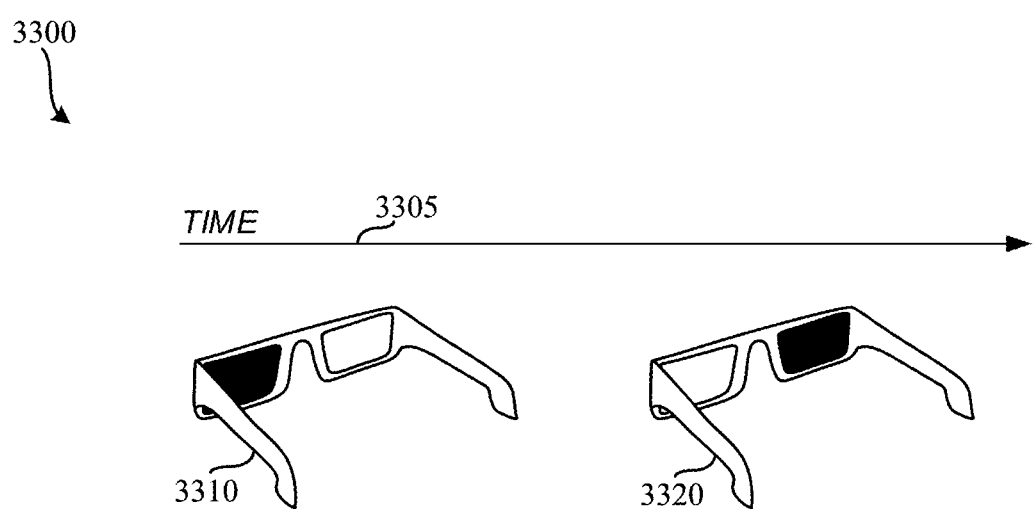
FIG. 33 is a timing diagram illustrating example states of stereoscopic glasses when used by a single user.

If the stereoscopic mode is to be used (e.g., block 3140 returns a result of YES), the example display controller 487 causes the display of content using a single active viewer stereoscopic mode. (Block 3145). An example approach to displaying content in a stereoscopic mode is shown in connection with FIG. 33. FIG. 33 is a timing diagram illustrating example states 3300 of stereoscopic glasses when used by a single user. In some examples, (e.g., examples where the display has a refresh rate between 120 Hz and 180 Hz), one active viewer may view stereoscopic content with applied perspective rendering. This is accomplished by utilizing lightweight, active shutter glasses that are synchronized to alternating frames written by the GPU on the output display. In the illustrated example of FIG. 33, a horizontal axis 3305 represents time. Each lens synchronizes to alternating frames, based on the stereoscopy effect applied (channel 1 on the left lens, channel 2 on the right lens). That is, at a first time 3310, a right lens enables the content to be displayed (e.g., to a right eye of the user) while a left lens prevents content from being displayed (e.g., to a left eye of the user). At a second time 3320, the right lens prevents the content from being displayed, while the left lens enables content to be displayed. Other viewers with active glasses will see a semi-stereoscopic representation rendered to the active viewer perspective. Other viewers without glasses will see shifted stereoscopic images and distorted content to the rendered active viewer perspective.

Returning to block 3130 of FIG. 31, if multiple users are present (e.g., block 3130 returns a result of YES), the example display controller 487 determines whether two users are present. (Block 3150). If two users are present (e.g., block 3150 returns a result of YES), the example display controller 487 causes the content to be displayed using a dual active viewer mode. (Block 3160) An example representation of the dual active viewer mode is shown below in connection with FIGS. 34 and/or 35.

Figure 34:
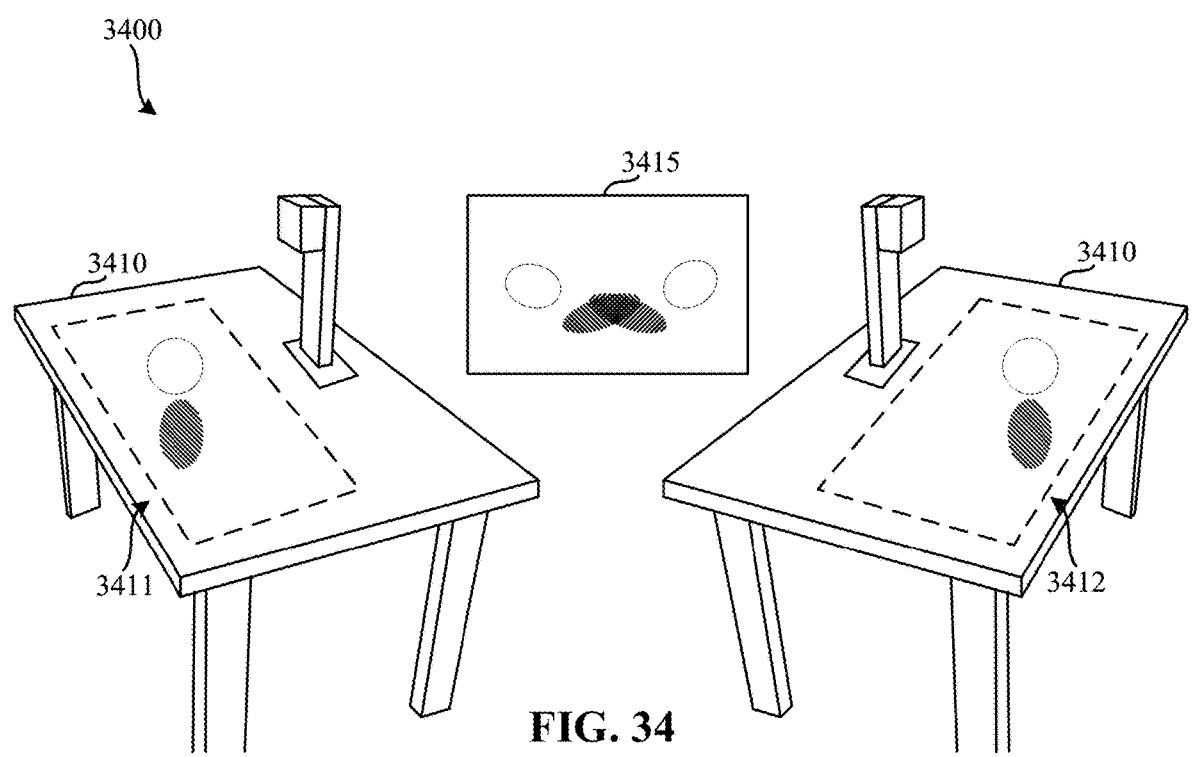
FIG. 34 is an example environment of use including a horizontal display surface viewed by multiple users.

FIG. 34 is an example environment of use 3400 including a horizontal display surface 3410 viewed by multiple users. In some examples (e.g., where a display offers at or above 120 Hz but below 180 Hz), a maximum of two "active" viewers may view content with applied perspective rendering for each user. For example, a first viewer may be presented a first perspective 3411, and a second user may be presented a second perspective 3412. In examples disclosed herein, this is accomplished by utilizing lightweight, active shutter glasses that are synchronized to alternating frames output by the display. In the illustrated example of FIG. 34, both lenses for each user output the same channel (i.e., each lens allows content from channel 1, or from channel 2). That is both the left and right lenses of the first viewer enable presentation of the first perspective 3411, while both the left and right lenses of the second viewer enable presentation of the second perspective 3412. A viewer (e.g., a third viewer) not wearing active shuttered glasses will see a buffer of both content views 3415, distorted to the "active" viewer perspective(s).

Figure 35:
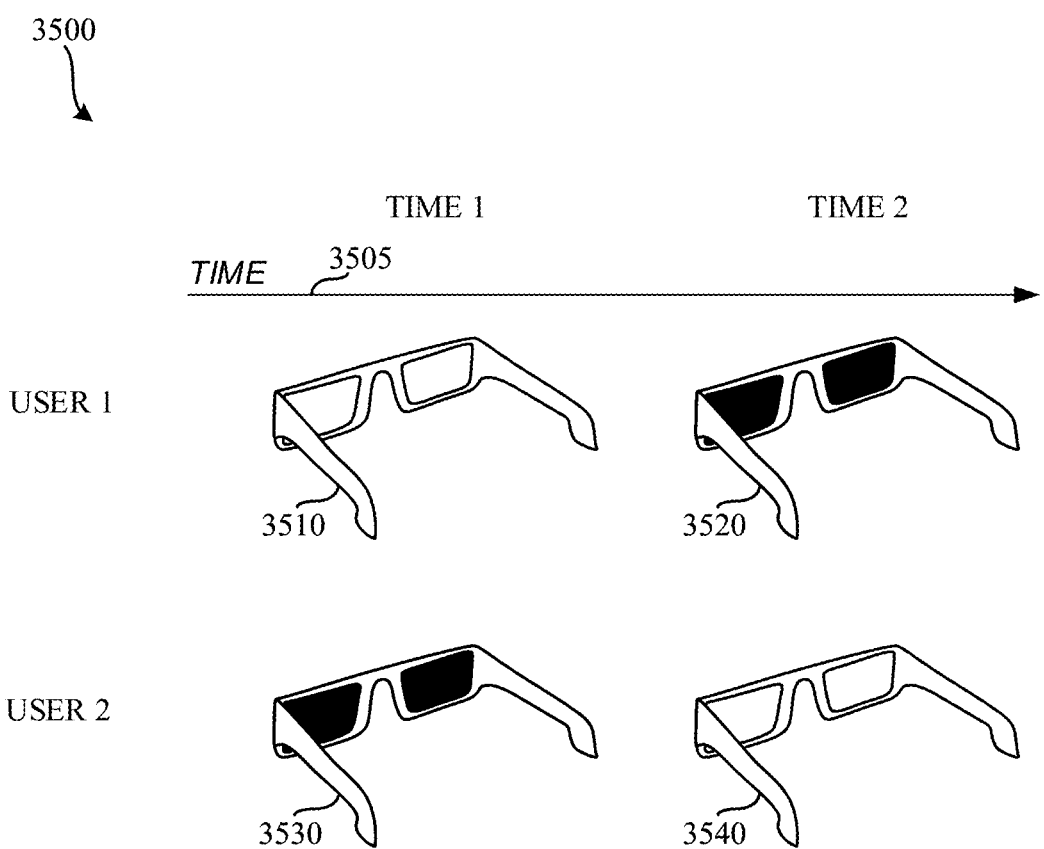
FIG. 35 is a timing diagram illustrating example states of stereoscopic glasses when used by two users.

FIG. 35 is a timing diagram 3500 illustrating example states of stereoscopic glasses when used by two users. In some examples, two users may use the augmented reality system in a non-stereoscopic mode, but each with their own applied perspective rendering. Like FIG. 34, a horizontal line 3505 represents time. At a first time, the first glasses of the first user enable the display of content 3510, while the second glasses of the second user disable the display of content 3530. At a second time, the first glasses of the first user disable the display of content 3520, while the second glasses of the second user enable the display of content 3540. A viewer not wearing active shuttered glasses will see both content views (e.g., the frame buffer 3415 of FIG. 34).

Returning to block 3150 of FIG. 31, if the example display controller 487 determines that more than two users are present (e.g., block 3150 returns a result of NO), the example display controller 487 causes the display of content using a high-frequency mode. (Block 3170). In some examples, one or more of the users may be presented the content in a stereoscopic mode.

Figure 36:
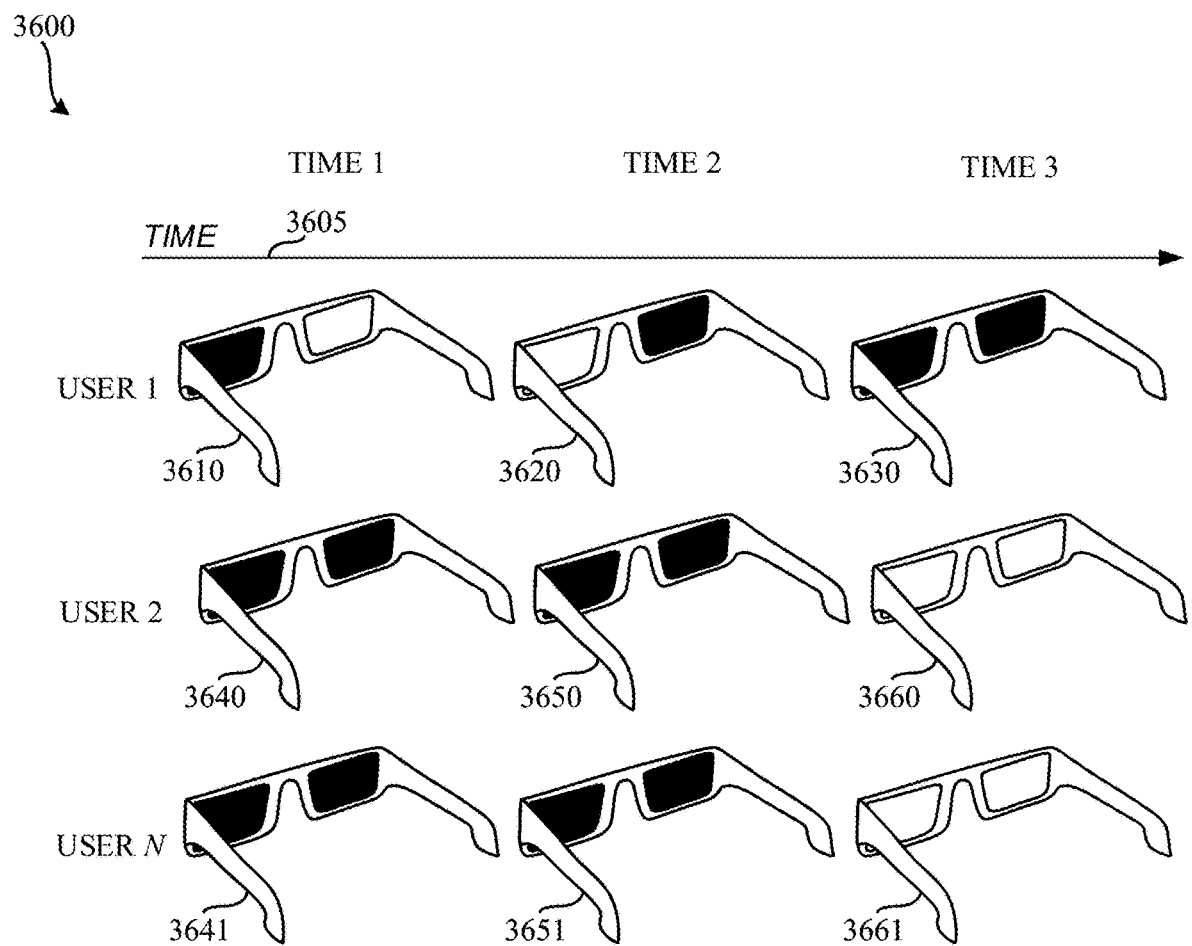
FIG. 36 is a timing diagram illustrating example states of stereoscopic glasses when used by N users, where a first user is presented the content in a stereoscopic mode, and the remaining N users are presented the content in a non-stereoscopic mode.

FIG. 36 is a timing diagram 3600 illustrating example states of stereoscopic glasses when used by N users, where a first user is presented the content in a stereoscopic mode, and the remaining N users are presented the content in a non-stereoscopic mode. With displays offering high refresh rates (e.g., refresh rates above 180 Hz), combinations of each of the above approaches of FIGS. 34 and/or 35 can be utilized with, for example, one non-stereoscopic viewer per 60 Hz, and one stereoscopic viewer per 120 Hz. In some examples, active shuttered glasses are necessary to handle synchronization at high frequency, with GPU pipelines capable of driving high refresh rates to synchronization signaling.

In the illustrated example of FIG. 36, a first user is presented a stereoscopic image, while a second user is presented a non-stereoscopic image. In FIG. 36, a horizontal line 3605 represents time. At a first time, the right lens of the glasses of the first user enables the display of content 3610. At the first time, the glasses of the second user and the Nth user prevent the display of content 3640, 3641. At a second time, the left lens of the glasses of the first user enables the display of content 3620. At the second time, the glasses of the second user and the Nth user continue to prevent the display of content 3650, 3651. At a third time, the lenses of the glasses of the first user prevent the display of content 3630. At the third time, the glasses of the second user and the Nth user enable the display of the content 3660, 3661.

In some alternative examples, glasses of active viewers are synchronized to corresponding tracked user positions, and a frame buffer is set for each light pulse encoding the current viewer active buffer on the display. One such solution for this is to enable channel selection on the glasses via a manual action of the user, after becoming an "active" viewer for perspective purposes. In some examples, this is implemented using a button selection, resulting in cycling of viewing modes until content is correctly displayed for that particular user.

In some other examples, a second channel transmission mode request is encoded in-band with a tracked user position (via a light emitting diode (LED)), thereby configuring the active viewer and channel mode from the glasses. For example, mode values and an active/inactive state may be used to determine which frame intervals the glasses are to display. That is, a channel 1 viewer displays frames 1, 1, etc. for multiple viewers as the tracked viewer. A stereoscopic viewer displays frames 1, 2, 1, 2, etc. as a regular mode stereoscopic system. A channel two viewer displays frames 2, 2, etc. for multiple viewers.

When glasses are individually identified and matched to tracked user position via a fiducial marker and/or other localization method, out-of-band signaling (via, for example, Bluetooth low energy (BLE)) can be used to configure a paired set of glasses with the correct mode and frame set via the active/inactive flow described above. In some examples, it is possible to also determine the desired user mode of content display by tracking whether an active user is wearing glasses (e.g., when glasses are removed). By introducing a separate glasses determination step into the workflow as a supplementary data generator, a single active user can trigger the shift of content from stereoscopic 3D mode to a standard 2D mode. This has the added benefit of optimizing the labeling modeling to minimize labeling errors due to users wearing active shutter glasses in other modes.

Figure 37:
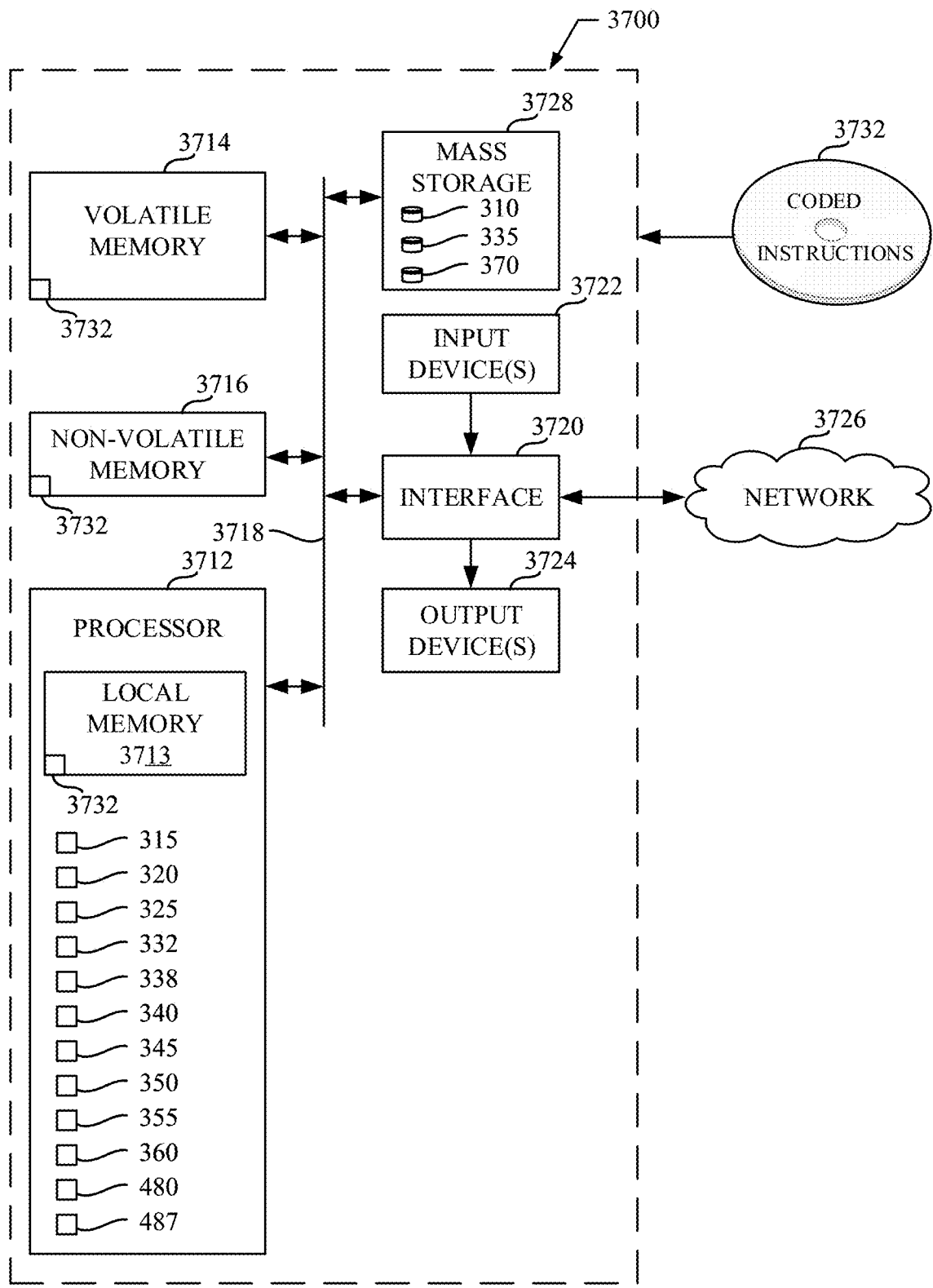
FIG. 37 is a block diagram of an example processor platform 3700 structured to execute the instructions of FIGS. 5, 6, 7, 9, 10, 11, 13, 17, 19, 23, and 31 to implement the augmented reality controller 305 of FIGS. 3 and/or 4.

FIG. 37 is a block diagram of an example processor platform 3700 structured to execute the instructions of FIGS. 5, 6, 7, 9, 10, 11, 13, 17, 20, 23, and/or 31 to implement the example augmented reality controller 130 of FIGS. 3 and/or 4. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set-top box, a headset or other wearable device, or any other type of computing device.

The processor platform 3700 of the illustrated example includes a processor 3712. The processor 3712 of the illustrated example is hardware. For example, the processor 3712 can be implemented by one or more integrated circuits, logic circuits, microprocessors, GPUs, DSPs, or controllers from any desired family or manufacturer. The hardware processor may be a semiconductor based (e.g., silicon-based) device. In this example, the processor implements the example buffer controller 315, the example image pre-processor 320, the example face detector 325, the example face detection model trainer 332, the example position tracker 338, the example position normalizer 340, the example user selector 345, the example camera position calculator 350, the example perspective transform generator 355, the example user detector 360, the example 3D glasses detector 480, and/or the example display controller 487.

The processor 3712 of the illustrated example includes a local memory 3713 (e.g., a cache). The processor 3712 of the illustrated example is in communication with a main memory including a volatile memory 3714 and a non-volatile memory 3716 via a bus 3718. The volatile memory 3714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 3716 may be implemented by flash memory and/or any other desired type of memory device. Access to the main memory 3714, 3716 is controlled by a memory controller.

The processor platform 3700 of the illustrated example also includes an interface circuit 3720. The interface circuit 3720 may be implemented by any type of interface standard, such as an Ethernet interface, a universal serial bus (USB), a Bluetooth® interface, a near field communication (NFC) interface, and/or a PCI express interface.

In the illustrated example, one or more input devices 3722 are connected to the interface circuit 3720. The input device(s) 3722 permit(s) a user to enter data and/or commands into the processor 3712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 3724 are also connected to the interface circuit 3720 of the illustrated example. The output devices 3724 can be implemented, for example, by display devices (e.g., a light emitting diode (LED), an organic light emitting diode (OLED), a liquid crystal display (LCD), a cathode ray tube display (CRT), an in-plane switching (IPS) display, a touchscreen, etc.), a tactile output device, a printer and/or speaker. The interface circuit 3720 of the illustrated example, thus, typically includes a graphics driver card, a graphics driver chip and/or a graphics driver processor.

The interface circuit 3720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 3726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 3700 of the illustrated example also includes one or more mass storage devices 3728 for storing software and/or data. Examples of such mass storage devices 3728 include floppy disk drives, hard drive disks, compact disk drives, Blu-ray disk drives, redundant array of independent disks (RAID) systems, and digital versatile disk (DVD) drives.

The machine executable instructions 3732 of FIGS. 5, 6, 7, 9, 10, 11, 13, 17, 20, 23, and/or 31 may be stored in the mass storage device 3728, in the volatile memory 3714, in the non-volatile memory 3716, and/or on a removable non-transitory computer-readable storage medium such as a CD or DVD. The example mass storage implements the example imaging buffer 310, the example face detection model data store 335, and/or the example configuration data store 370.

From the foregoing, it will be appreciated that example methods, apparatus, and articles of manufacture have been disclosed that enable new types of human-computer interaction. For example, by way of use of the example approaches disclosed herein, multiple users can collaborate around a display surface on a 3D model, with each user having their own perspective of the model displayed based on their particular vantage point. Using example approaches disclosed herein, the display can be updated for those multiple users and their corresponding vantage point(s) with enough frequency to provide a real and immersive user experience.

Example 1 includes an apparatus for interactive anamorphosis projection, the apparatus comprising a face detector to detect a face of a user in an image, the image captured by a sensor in proximity to a display surface, a position tracker to determine a face position of the detected face, a user selector to identify whether a user associated with the identified face is an active user, a camera position calculator to, in response to determining that the user associated with the identified face is an active user, calculate a position of an anamorphic camera in relation to the display surface based on the position of the detected face, and a perspective transform generator to apply a perspective correction to the anamorphic camera to cause the anamorphic camera to replicate a vantage point of the active user, the perspective transform generator to cause a display to render, on the display surface, a scene based on the vantage point of the active user.

Example 2 includes the apparatus of example 1, wherein the face detector is further to detect a face bounding rectangle, and the position tracker is to determine an estimated eye position within the face bounding rectangle.

Example 3 includes the apparatus of example 2, further including a position normalizer to normalize the eye position.

Example 4 includes the apparatus of example 3, wherein the position normalizer is to determine whether distortion correction has been applied to the image, and in response to determining that distortion correction has been applied to the image, normalize the eye position using a spline interpolation.

Example 5 includes the apparatus of any one of examples 1 through 4, wherein the anamorphic camera is a first anamorphic camera, the user is a first user, the vantage point is a first vantage point, the scene is a first scene, and the perspective transform generator is further to apply a second perspective correction to a second anamorphic camera to cause the second anamorphic camera to replicate a second vantage point of a second user, and cause the display to render, on the display surface, a second scene based on the vantage point of the second user.

Example 6 includes the apparatus of example 5, further including a display controller to synchronize a display with a first pair of lenses and a second pair of lenses, the first pair of lenses to enable display of the first scene to the first user, the second pair of lenses to enable display of the second scene to the second user.

Example 7 includes the apparatus of example 6, wherein the first pair of lenses are actively shuttered lenses.

Example 8 includes a system for interactive anamorphosis projection, the apparatus comprising a display surface, a sensor to capture an image of a face of a user, an augmented reality controller to access the image from the sensor, determine a position of the face of the user relative to the display surface, apply a perspective correction to an anamorphic camera representing a vantage point of the active user, a user application to generate a scene based on the position of the anamorphic camera, a display to present, at the display surface, the scene based on the vantage point of the active user.

Example 9 includes the system of example 8, wherein the display surface is a horizontal display surface.

Example 10 includes the system of example 8, wherein the display surface is a vertical display surface.

Example 11 includes the system of example 8, wherein the user application is a modeling application.

Example 12 includes the system of any one of examples 8 through 11, wherein the augmented reality controller is to select the user as an active user based on an amount of time that the face of the user has been detected.

Example 13 includes at least one non-transitory computer-readable medium comprising instructions which, when executed, cause at least one processor to at least detect a face of a user in an image, the image captured by a sensor in proximity to a display surface, determine a face position of the detected face, identify whether a user associated with the identified face is an active user, in response to determining that the user associated with the identified face is an active user, calculate a position of an anamorphic camera in relation to the display surface based on the position of the detected face, apply a perspective correction to the anamorphic camera to cause the anamorphic camera to replicate a vantage point of the active user, and cause a display to render, on the display surface, a scene based on the vantage point of the active user.

Example 14 includes the least one non-transitory computer-readable medium of example 13, wherein the instructions cause the at least one processor to determine the face position by at least detecting a face bounding rectangle, and determining an estimated eye position within the face bounding rectangle.

Example 15 includes the least one non-transitory computer-readable medium of example 14, wherein the instructions, when executed, further cause the at least one processor to normalize the eye position.

Example 16 includes the least one non-transitory computer-readable medium of example 15, wherein the instructions, when executed, cause the processor to normalize the eye position by at least determining whether distortion correction has been applied to the image, and in response to determining that distortion correction has been applied to the image, normalizing the eye position using a spline interpolation.

Example 17 includes the least one non-transitory computer-readable medium of example 13, wherein the face of the user corresponds to a first face of a first user, the position is a first position, the anamorphic camera is a first anamorphic camera, the perspective correction is a first perspective correction, the vantage point is a first vantage point, the scene is a first scene, and the instructions, when executed, cause the at least one processor to at least detect a second face of a second user in the image, determine a second face position of the second face, calculate a second position of a second anamorphic camera in relation to the display surface based on the second face position, apply a second perspective correction to the second anamorphic camera to cause the second anamorphic camera to replicate a second vantage point of the second user, and cause the display to render, on the display surface, a second scene based on the vantage point of the second user.

Example 18 includes the least one non-transitory computer-readable medium of example 17, wherein the instructions, when executed, cause the at least one processor to at least synchronize a display with a first pair of lenses and a second pair of lenses, the first pair of lenses to enable display of the first scene to the first user, the second pair of lenses to enable display of the second scene to the second user.

Example 19 includes the least one non-transitory computer-readable medium of example 18, wherein the first pair of lenses are actively shuttered lenses.

Example 20 includes the least one non-transitory computer-readable medium of example 18, wherein the first pair of lenses is to enable display of the first scene to the first user and the second pair of lenses is to enable display of the second scene to the second user during alternating time periods.

Example 21 includes a method for interactive anamorphosis projection, the method comprising detecting a face of a user in an image, the image captured by a sensor in proximity to a display surface, determining a face position of the detected face, identifying whether a user associated with the identified face is an active user, in response to determining that the user associated with the identified face is an active user, calculating a position of an anamorphic camera in relation to the display surface based on the position of the detected face, applying a perspective correction to the anamorphic camera to cause the anamorphic camera to replicate a vantage point of the active user, and causing a display to render, on the display surface, a scene based on the vantage point of the active user.

Example 22 includes the method of example 21, wherein the determining of the face position includes detecting a face bounding rectangle, and determining an estimated eye position within the face bounding rectangle.

Example 23 includes the method of example 22, further including normalizing the eye position.

Example 24 includes the method of example 23, wherein normalizing the eye position includes determining whether distortion correction has been applied to the image, and in response to determining that distortion correction has been applied to the image, normalizing the eye position using a spline interpolation.

Example 25 includes the method of example 21, wherein the face of the user corresponds to a first face of a first user, the position is a first position, the anamorphic camera is a first anamorphic camera, the perspective correction is a first perspective correction, the vantage point is a first vantage point, the scene is a first scene, and further including detecting a second face of a second user in the image, determining a second face position of the second face, calculating a second position of a second anamorphic camera in relation to the display surface based on the second face position, applying a second perspective correction to the second anamorphic camera to cause the second anamorphic camera to replicate a second vantage point of the second user, and cause the display to render, on the display surface, a second scene based on the vantage point of the second user.

Example 26 includes the method of example 25, further including synchronizing a display with a first pair of lenses and a second pair of lenses, the first pair of lenses to enable display of the first scene to the first user, the second pair of lenses to enable display of the second scene to the second user.

Example 27 includes the method of example 26, wherein the first pair of lenses are actively shuttered lenses.

Example 28 includes the method of example 26, wherein the first pair of lenses is to enable display of the first scene to the first user and the second pair of lenses is to enable display of the second scene to the second user during alternating time periods.

Example 29 includes an apparatus for interactive anamorphosis projection, the apparatus comprising means for detecting a face of a user in an image, the image captured by a sensor in proximity to a display surface, means for determining a face position of the detected face, means for identifying whether a user associated with the identified face is an active user, means for calculating, in response to determining that the user associated with the identified face is an active user, a position of an anamorphic camera in relation to the display surface based on the position of the detected face, and means for applying a perspective correction to the anamorphic camera to cause the anamorphic camera to replicate a vantage point of the active user, the means for applying to cause a display to render, on the display surface, a scene based on the vantage point of the active user.

Example 30 includes the apparatus of example 29, wherein the means for determining is further to detect a face bounding rectangle, and determine an estimated eye position within the face bounding rectangle.

Example 31 includes the apparatus of example 30, further including means for normalizing the eye position.

Example 32 includes the apparatus of example 31, wherein the means for normalizing is further to determine whether distortion correction has been applied to the image, and in response to determining that distortion correction has been applied to the image, normalize the eye position using a spline interpolation.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus for interactive projection, the apparatus comprising:
a buffer to receive image data from a sensor;
a buffer controller to move a stack top from a first portion of the image data to a second portion of the image data, and in response to determining that the first portion of the image data is not being processed, release the first portion of the image data from the buffer;
a face detector to detect a face of a user in an image from the second portion of the image data captured by the sensor in proximity to a display surface;
a position tracker to determine a face position of the detected face;
a camera position calculator to calculate a position of a virtual camera in relation to the display surface based on the position of the detected face; and
a perspective transform generator to apply a perspective correction to the virtual camera to cause the virtual camera to replicate a vantage point of the user, the perspective transform generator to cause a display to render, on the display surface, a scene based on the vantage point of the user.

2. The apparatus of claim 1, wherein the face detector is further to detect a face bounding rectangle, and the position tracker is to determine an estimated eye position within the face bounding rectangle.

3. The apparatus of claim 2, further including a position normalizer to normalize the estimated eye position.

4. The apparatus of claim 3, wherein the position normalizer is to determine whether distortion correction has been applied to the image, and in response to determining that distortion correction has been applied to the image, normalize the eye position using a spline interpolation.

5. The apparatus of claim 1, wherein the virtual camera is a first virtual camera, the user is a first user, the vantage point is a first vantage point, the scene is a first scene, and the perspective transform generator is further to apply a second perspective correction to a second virtual camera to cause the second virtual camera to replicate a second vantage point of a second user, and cause the display to render, on the display surface, a second scene based on the vantage point of the second user.

6. The apparatus of claim 5, further including a display controller to synchronize a display with a first pair of lenses and a second pair of lenses, the first pair of lenses to enable display of the first scene to the first user, the second pair of lenses to enable display of the second scene to the second user.

7. The apparatus of claim 6, wherein the first pair of lenses are actively shuttered lenses.

8. At least one non-transitory computer-readable medium comprising instructions which, when executed, cause at least one processor to at least:
receive image data from a sensor;
move a stack top from a first portion of the image data to a second portion of the image data, and in response to determining that the first portion of the image data is not being processed, release the first portion of the image data;
detect a face of a user in an image, the image from the second portion of the image data captured by the sensor in proximity to a display surface;
determine a face position of the detected face;
calculate a position of an anamorphic camera in relation to the display surface based on the position of the detected face;
apply a perspective correction to the anamorphic camera to cause the anamorphic camera to replicate a vantage point of the user; and
cause a display to render, on the display surface, a scene based on the vantage point of the user.

9. The least one non-transitory computer-readable medium of claim 8, wherein the instructions cause the at least one processor to determine the face position by at least:
detecting a face bounding rectangle; and
determining an estimated eye position within the face bounding rectangle.

10. The least one non-transitory computer-readable medium of claim 9, wherein the instructions, when executed, further cause the at least one processor to normalize the estimated eye position.

11. The least one non-transitory computer-readable medium of claim 10, wherein the instructions, when executed, cause the processor to normalize the eye position by at least:
determining whether distortion correction has been applied to the image; and
in response to determining that distortion correction has been applied to the image, normalizing the eye position using a spline interpolation.

12. The least one non-transitory computer-readable medium of claim 8, wherein the face of the user corresponds to a first face of a first user, the position is a first position, the anamorphic camera is a first anamorphic camera, the perspective correction is a first perspective correction, the vantage point is a first vantage point, the scene is a first scene, and the instructions, when executed, cause the at least one processor to at least:
detect a second face of a second user in the image;
determine a second face position of the second face;
calculate a second position of a second anamorphic camera in relation to the display surface based on the second face position;
apply a second perspective correction to the second anamorphic camera to cause the second anamorphic camera to replicate a second vantage point of the second user; and
cause the display to render, on the display surface, a second scene based on the vantage point of the second user.

13. The least one non-transitory computer-readable medium of claim 12, wherein the instructions, when executed, cause the at least one processor to at least synchronize a display with a first pair of lenses and a second pair of lenses, the first pair of lenses to enable display of the first scene to the first user, the second pair of lenses to enable display of the second scene to the second user.

14. The least one non-transitory computer-readable medium of claim 13, wherein the first pair of lenses are actively shuttered lenses.

15. The least one non-transitory computer-readable medium of claim 13, wherein the first pair of lenses is to enable display of the first scene to the first user and the second pair of lenses is to enable display of the second scene to the second user during alternating time periods.

16. An apparatus for interactive projection, the apparatus comprising:
means for receiving image data from a sensor;
means for moving a stack top from a first portion of the image data to a second portion of the image data, and in response to determining that the first portion of the image data is not being processed, releasing the first portion of the image data;

means for detecting a face of a user in an image, the image from the second portion of the image data captured by the sensor in proximity to a display surface;

means for determining a face position of the detected face;

means for identifying whether a user associated with the identified face is an active user;

means for calculating, in response to determining that the user associated with the identified face is an active user, a position of an anamorphic camera in relation to the display surface based on the position of the detected face; and means for applying a perspective correction to the anamorphic camera to cause the anamorphic camera to replicate a vantage point of the active user, the means for applying to cause a display to render, on the display surface, a scene based on the vantage point of the active user.

17. The apparatus of claim 16, wherein the means for determining is further to detect a face bounding rectangle, and determine an estimated eye position within the face bounding rectangle.

18. The apparatus of claim 17, further including means for normalizing the estimated eye position.

19. The apparatus of claim 18, wherein the means for normalizing is further to determine whether distortion correction has been applied to the image, and in response to determining that distortion correction has been applied to the image, normalize the eye position using a spline interpolation.

20. The apparatus of claim 16, wherein the virtual camera is a first virtual camera, the user is a first user, the vantage point is a first vantage point, the scene is a first scene, and the means for applying the perspective correction is further to apply a second perspective correction to a second virtual camera to cause the second virtual camera to replicate a second vantage point of a second user, and cause the display to render, on the display surface, a second scene based on the vantage point of the second user.

* * * * *